United States Patent
Shen et al.

(10) Patent No.: US 10,515,443 B2
(45) Date of Patent: Dec. 24, 2019

(54) UTILIZING DEEP LEARNING TO RATE ATTRIBUTES OF DIGITAL IMAGES

(71) Applicant: Adobe Inc., San Jose, CA (US)

(72) Inventors: Xiaohui Shen, San Jose, CA (US); Zhe Lin, Fremont, CA (US); Shu Kong, Irvine, CA (US); Radomir Mech, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 12 days.

(21) Appl. No.: 15/981,166

(22) Filed: May 16, 2018

(65) Prior Publication Data

US 2018/0268535 A1 Sep. 20, 2018

Related U.S. Application Data

(63) Continuation of application No. 15/097,113, filed on Apr. 12, 2016, now Pat. No. 10,002,415.

(51) Int. Cl.
*G06K 9/62* (2006.01)
*G06T 7/00* (2017.01)

(52) U.S. Cl.
CPC ............ *G06T 7/0002* (2013.01); *G06K 9/623* (2013.01); *G06K 9/6256* (2013.01); *G06T 2207/20081* (2013.01); *G06T 2207/30168* (2013.01)

(58) Field of Classification Search
CPC combination set(s) only.
See application file for complete search history.

(56) References Cited

U.S. PATENT DOCUMENTS

| | | | |
|---|---|---|---|
| 7,088,854 B2 * | 8/2006 | Cotman ............. | G06K 9/00127 382/165 |
| 8,370,282 B1 * | 2/2013 | Leung ................. | G06K 9/6263 706/20 |
| 8,712,157 B2 * | 4/2014 | Marchesotti .......... | G06T 7/0002 382/190 |

(Continued)

OTHER PUBLICATIONS

J. C. Caicedo, a. Kapoor, and S. B. Kang. Collaborative personalization of image enhancement. In Computer Vision and Pattern Recognition (CVPR), 2011 IEEE Conference on, pp. 249-256. IEEE, 2011.

(Continued)

*Primary Examiner* — Tsung Yin Tsai
(74) *Attorney, Agent, or Firm* — Keller Jolley Preece

(57) ABSTRACT

Systems and methods are disclosed for estimating aesthetic quality of digital images using deep learning. In particular, the disclosed systems and methods describe training a neural network to generate an aesthetic quality score digital images. In particular, the neural network includes a training structure that compares relative rankings of pairs of training images to accurately predict a relative ranking of a digital image. Additionally, in training the neural network, an image rating system can utilize content-aware and user-aware sampling techniques to identify pairs of training images that have similar content and/or that have been rated by the same or different users. Using content-aware and user-aware sampling techniques, the neural network can be trained to accurately predict aesthetic quality ratings that reflect subjective opinions of most users as well as provide aesthetic scores for digital images that represent the wide spectrum of aesthetic preferences of various users.

20 Claims, 10 Drawing Sheets

(56) References Cited

U.S. PATENT DOCUMENTS

| | | | | |
|---|---|---|---|---|
| 8,831,358 | B1* | 9/2014 | Song | G06K 9/623 382/190 |
| 9,336,302 | B1* | 5/2016 | Swamy | G06F 16/2465 |
| 9,613,058 | B2* | 4/2017 | Shen | G06F 16/5838 |
| 2002/0186882 | A1* | 12/2002 | Cotman | G06K 9/00127 382/165 |
| 2009/0281975 | A1* | 11/2009 | Atallah | G06F 16/50 706/18 |
| 2011/0074966 | A1* | 3/2011 | Cerosaletti | G06K 9/00664 348/222.1 |
| 2011/0075917 | A1* | 3/2011 | Cerosaletti | G06K 9/036 382/159 |
| 2011/0075930 | A1* | 3/2011 | Cerosaletti | G06K 9/00677 382/190 |
| 2012/0269425 | A1* | 10/2012 | Marchesotti | G06K 9/036 382/159 |
| 2014/0351264 | A1* | 11/2014 | Murray | G06F 16/583 707/748 |
| 2015/0278371 | A1* | 10/2015 | Anand | G06F 16/24578 707/723 |
| 2015/0294191 | A1* | 10/2015 | Zhang | G06N 20/00 382/160 |
| 2016/0035078 | A1* | 2/2016 | Lin | G06T 7/0002 382/157 |
| 2016/0098844 | A1* | 4/2016 | Shaji | G06F 16/5838 382/156 |
| 2016/0162482 | A1* | 6/2016 | Pesavento | G06F 16/5866 707/728 |
| 2016/0179844 | A1* | 6/2016 | Shen | G06F 16/5838 382/156 |
| 2016/0350336 | A1* | 12/2016 | Checka | G06K 9/6215 |
| 2017/0294010 | A1* | 10/2017 | Shen | G06T 7/0002 |
| 2019/0096086 | A1* | 3/2019 | Xu | G06T 7/11 |
| 2019/0147304 | A1* | 5/2019 | Liu | G06K 9/6828 382/157 |

OTHER PUBLICATIONS

S. Chopra, R. Hadsell, and Y. LeCun. Learning a similarity metric discriminatively, with application to face verification. In Computer Vision and Pattern Recognition, 2005. CVPR 2005. IEEE Computer Society Conference on, vol. 1, pp. 539-546. IEEE, 2005.

J. Cui, F.Wen, R. Xiao, Y. Tian, and X. Tang. Easyalbum: an interactive photo annotation system based on face clustering and re-ranking. In Proceedings of the SIGCHI conference on Human factors in computing systems, pp. 367-376. ACM, 2007.

R. Datta, D. Joshi, J. Li, and J. Z. Wang. Studying aesthetics in photographic images using a computational approach. In Computer Vision—ECCV 2006, pp. 288-301. Springer, 2006.

S. Dhar, V. Ordonez, and T. L. Berg. High level describable attributes for predicting aesthetics and interestingness. In Computer Vision and Pattern Recognition (CVPR), 2011 IEEE Conference on, pp. 1657-1664. IEEE, 2011.

B. Geng, L. Yang, C. Xu, X.-S. Hua, and S. Li. The role of attractiveness in web image search. In Proceedings of the 19th ACM International Conference on Multimedia, pp. 63-72. ACM, 2011.

K. He, X. Zhang, S. Ren, and J. Sun. Spatial pyramid pooling in deep convolutional networks for visual recognition. In ECCV, pp. 346-361. Springer, 2014.

Y. Jia, E. Shelhamer, J. Donahue, S. Karayev, J. Long, R. Girshick, S. Guadarrama, and T. Darrell. Caffe: Convolutional architecture for fast feature embedding. arXiv preprint arXiv:1408.5093, 2014.

L. Kang, P. Ye, Y. Li, and D. Doermann. Convolutional neural networks for no-reference image quality assessment. In Computer Vision and Pattern Recognition (CVPR), 2014 IEEE Conference on, pp. 1733-1740. IEEE, 2014.

S.Karayev, M. Trentacoste, H. Han, A. Agarwala, T. Darrell, A. Hertzmann, and H.Winnemoeller. Recognizing image style. arXiv preprint arXiv:1311.3715,2013.

Y. Ke, X. Tang, and F. Jing. The design of high-level features for photo quality assessment. In Computer Vision and Pattern Recognition, 2006 IEEE Computer Society Conference on, vol. 1, pp. 419-426. IEEE, 2006.

A. Krizhevsky, I. Sutskever, and G. E. Hinton. Imagenet classification with deep convolutional neural networks. In Advances in neural information processing systems, pp. 1097-1105, 2012.

C. Lee, S. Xie, P.W. Gallagher, Z. Zhang, and Z. Tu. Deeply supervised nets. In AISTATS, 2015.

D. G. Lowe. Distinctive image features from scaleinvariant keypoints. International journal of computer vision, 60(2):91-110,2004.

X. Lu, Z. Lin, H. Jin, J. Yang, and J. Z. Wang. Rapid: Rating pictorial aesthetics using deep learning. In Proceedings of the ACM International Conference on Multimedia, pp. 457-466. ACM, 2014.

Lu, Z. Lin, X. Shen, R. Mech, and J. Z. Wang. Deep multi-patch aggregation network for image style, aesthetics, and quality estimation. ICCV, 2015.

W. Luo, X.Wang, and X. Tang. Content-based photo quality assessment. In Computer Vision (ICCV), 2011 IEEE International Conference on, pp. 2206-2213. IEEE, 2011.

Y. Luo and X. Tang. Photo and video quality evaluation: Focusing on the subject. In ECCV, pp. 386-399. Springer, 2008.

L. Marchesotti, N. Murray, and F. Perronnin Discovering beautiful attributes for aesthetic image analysis. International Journal of Computer Vision, pp. 1-21, 2014.

L. Marchesotti, F. Perronnin, D. Larlus, and G. Csurka. Assessing the aesthetic quality of photographs using generic image descriptors. In ICCV, pp. 1784-1791. IEEE, 2011.

L. Marchesotti, F. Perronnin, and F. Meylan. Learning beautiful (and ugly) attributes. BMVC, 2013.

N. Murray, L. Marchesotti, and F. Perronnin Ava: A largescale database for aesthetic visual analysis. In Computer Vision and Pattern Recognition (CVPR), 2012 IEEE Conference on, pp. 2408-2415. IEEE, 2012.

N. Murray, L. Marchesotti, F. Perronnin, and F. Meylan. Learning to rank images using semantic and aesthetic labels. In BMVC, pp. 1-10, 2012.

J. L. Myers, A. Well, and R. F. Lorch. Research design and statistical analysis. Routledge, 2010.

M. Nishiyama, T. Okabe, I. Sato, and Y. Sato. Aesthetic quality classification of photographs based on color harmony. In Computer Vision and Pattern Recognition (CVPR), 2011 IEEE Conference 33-40. IEEE, 2011.

D. Parikh and K. Grauman. Relative attributes. In Computer Vision (ICCV), 2011 IEEE International Conference on, pp. 503-510. IEEE, 2011.

F. Perronnin and C. Dance. Fisher kernels on visual vocabularies for image categorization. In Computer Vision and Pattern Recognition, 2007. CVPR'07. IEEE Conference on, pp. 1-8. IEEE, 2007.

F. Perronnin, J. Sanchez, and T. Mensink. Improving the fisher kernel for large-scale image classification. In ECCV, pp. 143-156. Springer, 2010.

J. San Pedro, T. Yeh, and N. Oliver. Leveraging user comments for aesthetic aware image search reranking. In Proceedings of the 21st international conference on World Wide Web, pp. 439-448. ACM, 2012.

F. Schroff, D. Kalenichenko, and J. Philbin. Facenet: A unified embedding for face recognition and clustering. In CVPR, pp. 815-823, 2015.

K. Simonyan and A. Zisserman. Very deep convolutional networks for large-scale image recognition. arXiv preprint arXiv:1409.1556, 2014.

J. Wang, Y. Song, T. Leung, C. Rosenberg, J. Wang, J. Philbin, B. Chen, and Y. Wu. Learning fine-grained image similarity with deep ranking. In Computer Vision and Pattern Recognition (CVPR), 2014 IEEE Conference on, pp. 1386-1393. IEEE, 2014.

L. Xin, L. Zhe, S. Xiaohui, M. Radomir, and W. James Z. Deep multi-patch aggregation network for image style, aesthetics, and quality estimation. ICCV, 2015.

U.S. Appl. No. 15/097,113, May 11, 2017, Office Action.
U.S. Appl. No. 15/097,113, Oct. 3, 2017, Office Action.
U.S. Appl. No. 15/097,113, Feb. 9, 2018, Notice of Allowance.

(56) References Cited

OTHER PUBLICATIONS

X. Lu, Z. Lin, X. Shen, R. Mech, and J. Z. Wang. Deep multi-patch aggregation network for image style, aesthetics, and quality estimation. ICCV, 2015.

M. Nishiyama, T. Okabe, I. Sato, and Y. Sato. Aesthetic quality classification of photographs based on color harmony. In Computer Vision and Pattern Recognition (CVPR), 2011 IEEE Conference on, pp. 33-40. IEEE, 2011.

* cited by examiner

402 ⟶

| Model | MSE | MAE | ρ |
|---|---|---|---|
| Binary | 0.1601 | 0.3563 | 0.5923 |
| Euclidean | 0.0260 | 0.1321 | 0.6239 |
| Pairwise | 0.0254 | 0.1291 | 0.6382 |
| Euclidean+Pairwise | 0.0239 | 0.1219 | 0.6515 |

| Model | MSE | MAE | ρ |
|---|---|---|---|
| Binary | 0.1601 | 0.3563 | 0.5923 |
| Euclidean | 0.0260 | 0.1321 | 0.6239 |
| Euclidean+Attributes | 0.0235 | 0.1228 | 0.6469 |

| Model | MAE | ρ |
|---|---|---|
| Median Guess | 0.1699 | - |
| AlexNet Convolution | 0.3563 | 0.5923 |
| Euclidean | 0.1321 | 0.6239 |
| Euclidean+Pairwise (cross-user) | 0.1233 | 0.6308 |
| Euclidean+Pairwise (common user) | 0.1219 | 0.6515 |
| Euclidean+Pairwise+Attributes | 0.1205 | 0.6656 |
| Euclidean+Pairwise+Content-Aware | 0.1218 | 0.6737 |
| Euclidean+Pairwise+Attributes+Content-Aware | 0.1182 | 0.6782 |

*Fig. 4C*

UTILIZING DEEP LEARNING TO RATE ATTRIBUTES OF DIGITAL IMAGES

CROSS REFERENCE TO RELATED APPLICATIONS

The present application is a continuation of U.S. application Ser. No. 15/097,113, filed Apr. 12, 2016. The aforementioned application is hereby incorporated by reference in its entirety.

BACKGROUND

1. Technical Field

The present disclosure relates generally to rating aesthetics in digital images. More specifically, one or more embodiments of the present disclosure relate to systems and methods that techniques to efficiently train a neural network to accurately predict aesthetics ratings for digital images.

2. Background and Relevant Art

Recent years have seen a rapid proliferation in the use of digital images. Indeed, with the advancement of digital cameras, smartphones, and general capabilities of electronic devices, many individuals and businesses utilize computing devices to manage storage and access of digital images. For example, many computing devices enable users to easily retrieve and utilize digital images from large collections of digital images stored on a computing device.

Because of the sheer number of photos that are often stored on computing devices, many users experience frustration in efficiently distinguishing between high quality and low quality images from a large collection of digital images. As such, many conventional devices assist users in retrieving and utilizing images by classifying digital images within various collections of digital images based on user ratings and/or other aesthetic metrics assigned to various digital images. For example, computing devices can classify digital images as high quality images or low quality images and categorize the digital images accordingly. Nevertheless, conventional systems for classifying and/or categorizing digital images have numerous problems and shortcomings.

For example, many conventional systems fail to effectively rate digital images whose quality or aesthetic appeal falls somewhere between very high and very low ratings (e.g., high and low quality photos). In particular, many conventional systems utilize a binary classification system to rate digital images. For example, digital images are typically grouped into high and low quality categories. While conventional systems effectively rate high and low quality digital images, these systems often fail to provide accurate or reliable classifications for those images that fall somewhere between high and low quality.

Additionally, in rating aesthetic quality of digital images, conventional systems often fail to provide meaningful information other than a binary classification (e.g., high or low overall quality). For example, even where conventional systems provide a technically accurate rating (e.g., high or low quality) for a particular digital image, conventional systems fail to provide any reason, comprehensive explanation, or additional information associated with the particular rating (e.g., on how or why certain digital images are rated accordingly).

Further, many conventional systems fail to accurately predict metrics that involve aesthetic appeal or other subjective opinions. For example, because users often have different opinions about image quality and other metrics, conventional machine learning systems experience difficulty accounting for inconsistencies in labeled data indicating aesthetic quality. As a result, conventional systems for rating or otherwise classifying images often produce inconsistent or inaccurate results that fail to reflect the subjective taste of some users.

These and other problems exist with regard to rating aesthetic quality for digital images.

BRIEF SUMMARY

Introduced herein are techniques and technologies for rating aesthetics of digital images using deep learning techniques. In particular, systems and methods described herein include a neural network having a training structure that utilizes pairs of training images to train the neural network to accurately predict an aesthetic quality of digital images. For example, a training structure of the neural network considers differences in user ratings assigned to pairs of training images. By using pairs of training images to train the neural network, the neural network is able to reduce or eliminate the effects of inconsistent ratings in the training images and otherwise help ensure accurate and consistent aesthetic rankings.

The systems and methods employ content-aware and user-aware sampling techniques to identify image pairs that have similar content and/or image pairs that have been rated by the same user or different users. By selecting pairs of training images that have been rated by common users and/or selecting pairs of training images having similar content while training the neural network, systems and methods described herein reduce or eliminate subjective differences between user ratings as a result of different raters, types of images, etc. By selecting pairs of training images that have been rated by different users, systems and methods described herein Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 4A-4C illustrate a plurality of tables comparing accuracy of different neural networks in accordance with one or more embodiments;

DETAILED DESCRIPTION

Figure 1:
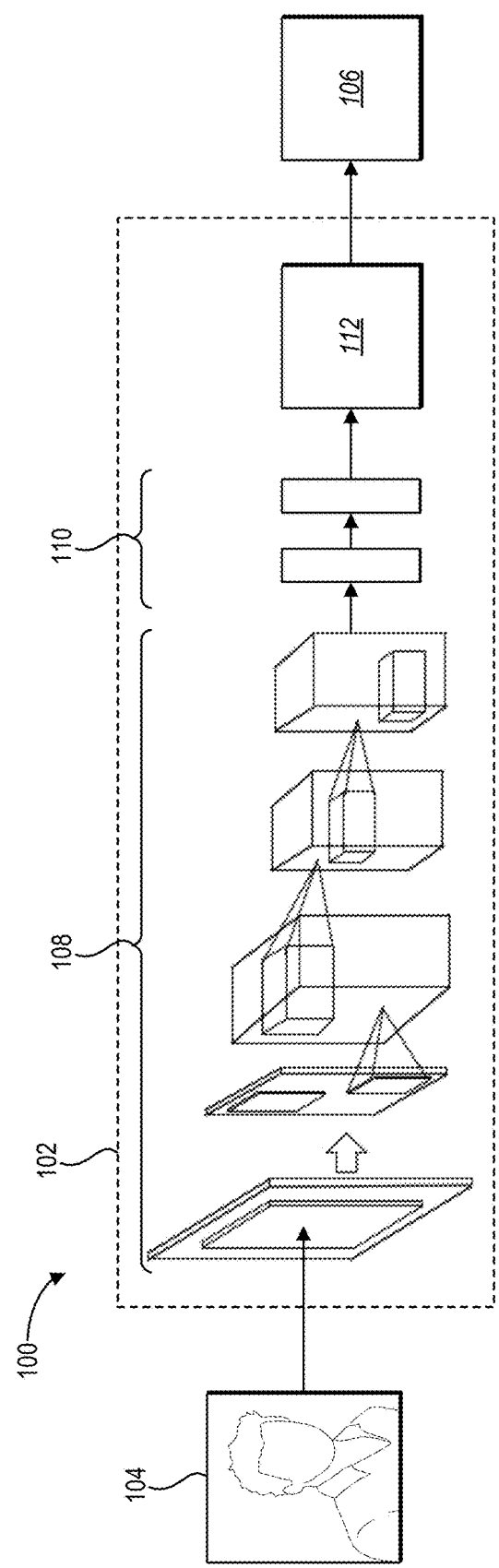
FIG. 1 illustrates a diagram of a process of generating an aesthetic quality score for a digital image in accordance with one or more embodiments.

One or more embodiments of the present disclosure include an image rating system comprising a neural network that generates an aesthetic quality score that accurately reflects the aesthetic quality of a digital image. In particular, one or more embodiments described herein includes a deep convolutional neural network that considers differences in user ratings assigned to pairs of training images. By using pairs of training images to train the neural network, the neural network is able to reduce or eliminate the effects of inconsistent ratings in the training images. As such, one or more embodiments described herein include a trained neural network that produces an aesthetic quality score that more accurately reflects relative differences in quality between digital images beyond conventional binary rating systems that only produce accurate results for digital images that are clearly high quality or low quality. Additionally, utilizing image pairs and comparing relative differences in training enables the convolutional neural network to produce an aesthetic quality score less skewed by differences between the subjective tastes of users that rated the training images.

For example, in one or more embodiments, the image rating system selects image pairs based on the identities of the users that rated the respective training images. For instance, the image rating system can utilize a user-aware selection technique to identify training images that have been rated by the same user. Selecting images rated by the same user ensures greater consistency between user ratings for different images. For example, where a user gives a first image a 5-star rating and a second image a 3-star rating, the image rating system confidently learns that the difference between the user ratings reflects a measurable difference in the subjective taste of the user for the different images. As such, the image rating system utilizes the relative difference between the user's ratings with greater confidence when training the convolutional neural network.

In addition to comparing relative differences between user ratings from the same user, the image training system accounts for differences in user ratings between different users. Utilizing ratings from different users enable the image training system to minimize inaccuracies by accounting for subjective differences in taste between different users as well as rating habits of different users. For example, where a user routinely rates images as high quality and very few images as low quality, the image training system compares the scores of that user to other users that have more variety in rating the training images to account for different tastes or rating habits of various users. As such, the image rating system minimizes subjective differences caused as a result of subjective tastes or rating habits of different users.

In addition to utilizing user-awareness in selecting image pairs, in one or more embodiments, the image rating system utilizes content-awareness to account for differences in user ratings given to training images having different types of content. For example, the image rating system may discover that user ratings for the training images are generally higher for landscape photos when compared to portrait photos. As such, the image training system identifies image pairs having similar types of content when training the neural network. Thus, the image rating system minimizes inconsistencies in user ratings caused as a result of users rating various types of training images differently.

By utilizing images pairs based on user-aware and content-aware selection techniques, the image rating system efficiently and accurately trains a convolutional neural network. In particular, by utilizing content-aware and user-aware selection techniques, the image training system accounts for subjective differences in taste between different users as well as accounts for inconsistencies between ratings for different types of training images. In this way, the image rating system more accurately trains the neural network to generate aesthetic scores for digital images.

Additionally, by utilizing content-aware and user-aware sampling techniques, the image rating system can train the convolutional neural network using fewer training images than conventional systems. For example, by accounting for user-specific preferences and differences in user ratings for different pairs of training images, the image rating system can assume greater confidence in user ratings of training images. Thus, utilizing content-aware and user-aware sampling techniques enables the image rating system train the neural network using fewer training images and associated user rating data.

In addition to providing more accurate user ratings for digital images, training the neural network by comparing user ratings for pairs of training images further enables the neural network to generate aesthetic quality scores that reflect a wide spectrum of user ratings for various digital images. In particular, by comparing relative difference between user ratings for pairs of training images, the image rating system trains the neural network to provide user ratings that accurately reflect a wide spectrum of user ratings that better reflect the spectrum of subjective taste of users for digital images. As such, training the neural network by comparing user ratings for image pairs improves upon the accuracy of binary rating systems for most digital images that fall between very high and very low quality. As mentioned, the image rating system trains the neural network using pairs of training images from a database of training images. In particular, the image rating system trains a neural network based on a dataset of training data that includes user ratings, scores, and other information associated with respective image pairs. In one or more embodiments, the dataset includes one or more user ratings assigned to respective training images. For example, the training dataset includes user aesthetic ratings that have been assigned by individual users. In particular, the training dataset can include user-assigned scores or ratings that reflect the subjective tastes of users that have rated the training images.

As described above, the image rating system uses the dataset of training data associated with pairs of training images to train a neural network to generate an aesthetic quality score for one or more digital images. For example, in one or more embodiments, the image training system trains the neural network to output an aesthetic quality score on a scale (such as from 1 to 5 or 1 to 10) for a digital image that reflects an overall aesthetic quality of the digital image for most users while minimizing inaccuracies caused as a result of differences in rating methods used by the raters of the training images.

As will be described in greater detail below, in training the neural network, the image rating system can train one or more layers of the structure of the neural network. For example, in one or more embodiments, the neural network includes a loss layer that utilizes a regression loss model. In one or more embodiments, the regression loss model is a fine-tuned regression function (e.g., Euclidean loss function). The regression loss model allows the neural network to output an aesthetic quality score on a scale (such as from 1 to 5 or 1 to 10).

As mentioned above, the image rating system further improves the accuracy of the aesthetic quality score by comparing relative rankings of training images pairs as well as normalizing a relative aesthetic score to more accurately rate the aesthetic quality of a digital image. To accomplish this, the image rating system utilizes a pairwise loss model that cooperates with the regression loss model to predict the aesthetic quality score for an input image. In particular, as will be described in further detail below, the neural network includes a pairwise loss model trained by comparing relative rankings of image pairs selected from the database of training images. For example, the image rating system selects pairs of training images, as described above. The image rating system compares the difference in the relative rankings between the image pairs. The image rating system then utilizes the relative difference to train the pairwise loss model. For example, the image rating system can maintain a relative difference in ratings between different users to reflect that one known rater consistency give higher ratings than another known user.

Similarly, in one or more embodiments, the image rating system utilizes user-aware features to further fine-tune the training of the neural network by training the neural network using image pairs that have been rated by the same user. In particular, because different user ratings from the same user are more likely to reflect a difference in quality between different training images, training the neural network using pairs of training images rated by the same user improve upon the accuracy of the trained neural network. Additionally, or alternatively, the image rating system can train the neural network using image pairs rated by different users. In particular, where a user consistently rates images higher than another user, comparing the differences in user ratings between image pairs from different users enables the image rating system to avoid inaccuracies caused by different users that consistently rate images differently. As such, utilizing user-awareness in selecting image pairs enables the image rating system to more efficiently train the neural network generate accurate aesthetic quality scores.

Additionally, the image rating system utilizes content-aware features to further fine-tune the training of the neural network to accurately predict aesthetic quality scores for digital images that include different types of content. In particular, because user ratings for images having similar content generally have more consistent user ratings than images having different types of content, the image rating system can identify image pairs having similar content. For example, the image rating system selects pairs of images of similar types (e.g., portrait images, landscape images) or that have been identified as including similar content and train the neural network to consider the type of content of a digital image when determining an aesthetic quality score. As such, the image rating system efficiently trains the neural network and enables the neural network to more accurately predict aesthetic quality scores.

In addition to the regression loss model and the pairwise loss model referred to above, one or more embodiments of the neural network includes attribute specific loss models that are utilized to further fine-tune a prediction of attribute quality scores. For example, in one or more embodiments, the image rating system compares user ratings of digital images having specific attributes identified by the users rating the digital images. In particular, where users who rated the training images have identified specific attributes of the training images, the image training system can further select image pairs having one or a combination of different attributes to further improve upon the process of training the neural network to generate aesthetic quality scores. Additionally, as described in further detail below, considering identified attributes of the training images can further enable the neural network to provide an aesthetic quality score that includes details about specific attributes detected within digital images. For example, in addition to generating an overall quality score, the neural network can further provide an aesthetic quality score that includes an identification of one or more attributes detected within a digital image.

By training a loss layer that includes various loss models, the image rating system provides a more accurate and comprehensive aesthetic quality score for digital images than conventional binary classification models. For example, as mentioned above, where binary classification models often fail to accurately classify digital images of a particular quality that falls, e.g., somewhere between very good or very bad, the image rating system trains the neural network to provide an accurate quality rating for the majority of digital images having various ranges of image quality. In particular, the neural network generates aesthetic quality scores that more accurately reflect the wide spectrum of quality between "good" and "bad."

In addition to providing a wider spectrum of overall aesthetic quality scores, the neural network further provides a more comprehensive rating or score than conventional systems. For example, by training attribute specific loss layers, the image rating system generates attribute quality scores. In particular, the trained neural network identifies specific attributes present in a digital image. In addition to generally identifying attributes that are present in a digital image, one or more embodiments of the image rating system can train the neural network to generate an attribute quality score for individual attributes.

Turning now to FIG. 1, additional detail will be provided with regard to utilizing a neural network to generate an aesthetic quality score for one or more digital images. As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes one or more machine learning algorithms. In particular, the term neural network can include deep convolutional neural networks (i.e., "CNNs") and fully convolutional neural networks (i.e., "FCNs"). In other words, a neural network is an algorithm (or set of algorithms) that implements deep learning techniques that utilize a set of algorithms to model high-level abstractions in data. As used herein, a regression neural network refers to a neural network having a regression loss model in the loss layer. The following description and figures refer to a regression CNN. One will appreciate that in alternative embodiments other types of neural networks may be utilized.

Referring now to the figures, FIG. 1 illustrates an image rating system 100 that includes a regression CNN 102 that has been trained to receive an input image 104 and generate an output 106 (e.g., an aesthetic quality score). In particular, the regression CNN 102 receives an input image 104 and analyzes the input image 104 through a series of applied layers of the regression CNN 102 including, for example, a plurality of convolutional layers 108, fully-connected layers 110, and a loss layer 112 to produce an output 106 that includes an aesthetic quality score for the input image 104.

An architecture of the regression CNN 102 can include a stack of distinct layers that process portions of an input image. Each of the layers can combine to emulate the behavior of a visual cortex. In particular, the combination of layers can exploit strong spatially local correlation present in images to train the regression CNN 102 to generate an aesthetic quality score for a digital image. As shown in FIG. 1, the regression CNN 102 includes a plurality of convolutional layers 108, fully-connected layers 110, and a loss layer 112. Additionally, in one or more embodiments, the regression CNN 102 includes one or more pooling layers, Re-LU layers, and/or de-convolutional layers utilized in conjunction with the convolutional layers 108, fully-connected layers 110, and loss layer 112. In one or more embodiments, the convolutional layers 108, fully-connected layers 110, and additional layers that precede the loss layer 112 include similar features and functionality as one or more neural networks described in "ImageNet Classification with Deep Convolutional Neural Networks" by A. Kirzhevsky, I. Sutskever, and G. E. Hinton in Advances in Neural Information Processing Systems 25, 2012 at pages 1097-1105, which is incorporated by reference herein in its entirety.

For example, the convolutional layers 108 can include learnable filters that are trained to analyze features or characteristics of a digital image and identify specific characteristics of a digital image. Additionally, the fully-connected layers 110 can be fully connected to other layers of the regression CNN 102 and include features and functionality for performing high level reasoning in the regression CNN 102. Moreover, as described in further detail below, the loss layer 112 includes one or more models to penalize deviation between predicted labels (e.g., predicted aesthetic rating) and true labels or ground truths (e.g., user provided ratings of training images) associated with training images utilized to train the regression CNN 102.

As mentioned above, the image rating system 100 trains the regression CNN 102 to generate an aesthetic quality score for the input image 104 utilizing a database of training images and associated training data. In particular, the image rating system 100 can fine-tune one or more layers of the regression CNN 102 to analyze images and identify features that correspond to features of a database of training images. For example, in one or more embodiments, the loss layer 112 includes a Euclidean loss function that the image rating system 100 fine-tunes to generate an output based on training data associated with the training image. In one or more embodiments, the image rating system 100 utilizes the following the Euclidean loss function:

$$loss_{reg} = \frac{1}{2N}\sum_{i=1}^{N}\|\bar{y}_i - y_i\|_2^2 = \frac{1}{2N}\sum_{i=1}^{N}\|CNN(X_i) - y_i\|_2^2$$

where N represents the number of training images for the dataset, $X_i$ is the i-th training image, $y_i$ is an associated user rating (or average of user ratings) for the i-th training image, and $\bar{y}_i = CNN(X_i)$ is the rated score by the regression CNN 102 for training image $X_i$.

It is appreciated that $CNN(X_i) - y_i$ represents a difference between a generated score of the regression CNN 102 for a training image and a user provided rating or score (e.g., average score of multiple user provided ratings) from the dataset of training data corresponding to the training image. In one or more embodiments, the image rating system 100 fine-tunes the regression loss function (e.g., Euclidean loss function) by running one or more iterations of the Euclidean loss function for each of the training images of the database of training images. Thus, with each iteration, the regression loss model generates an output that more accurately reflects an aesthetic quality score for a corresponding training image, thus training the regression loss model to more accurately predict an aesthetic quality score for the input image 104.

In addition to training the loss layer 112, the image rating system 100 jointly trains each of the layers of the regression CNN 102 to generate an aesthetic quality score for the input image 104 that accurately predicts an aesthetic appeal for the input image 104 to one or more users generally. Further, as will be explained in greater detail below, the image rating system 100 can train the regression CNN 102 to generate an aesthetic quality score including an overall quality score as well as more comprehensive information associated with the aesthetic quality and/or attributes of the input image 104.

Figure 2:
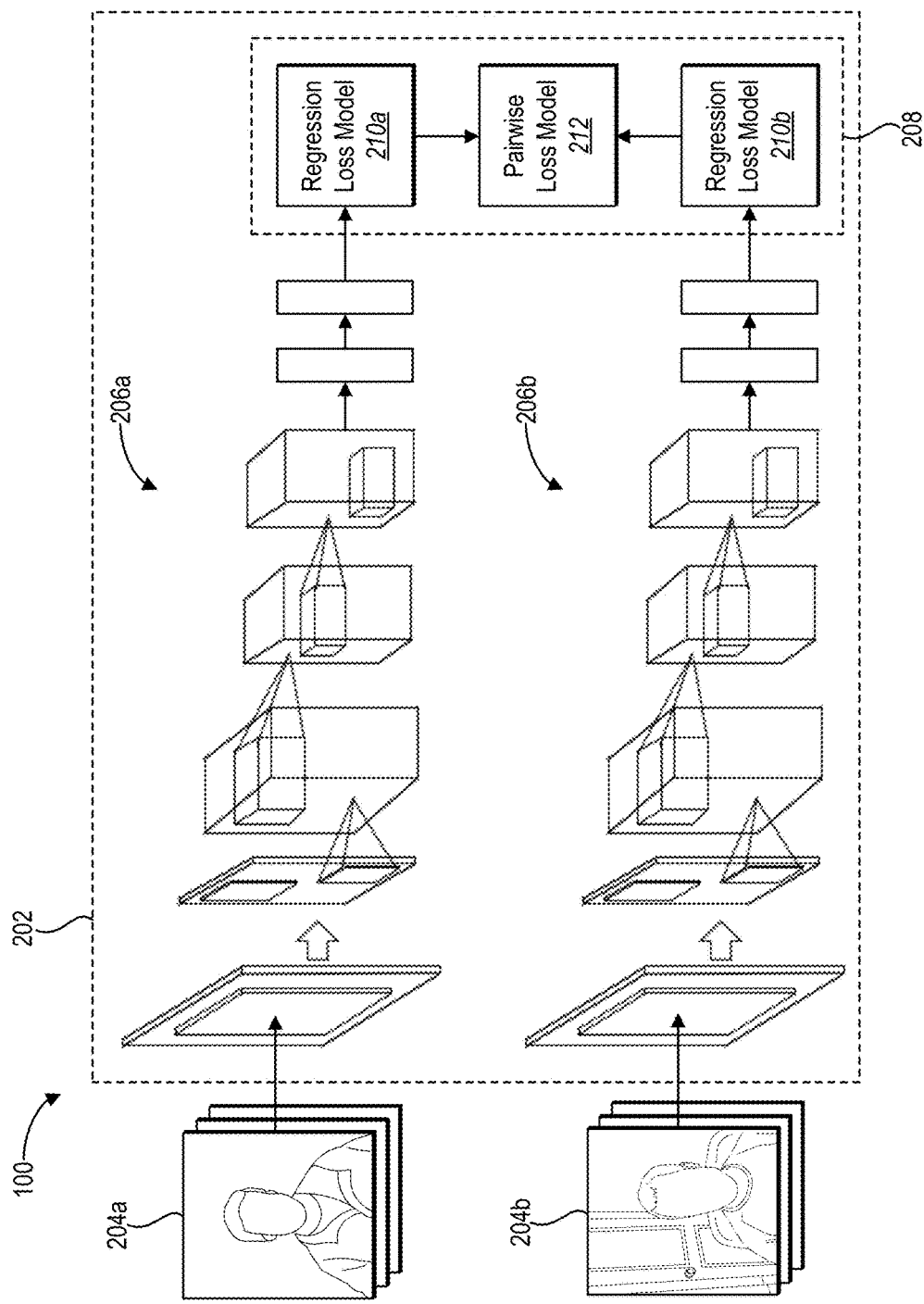
FIG. 2 illustrates a diagram of a process of training a regression convolutional neural network (or simply "regression CNN") including a regression loss model and a pairwise ranking model in accordance with one or more embodiments.

As shown in FIG. 2, the image rating system 100 trains a regression CNN 202 including a loss layer 208 that includes regression loss models 210a-b and a pairwise loss model 212 within the loss layer 208 of the regression CNN 202. Additionally, as shown in FIG. 2, the regression CNN 202 includes low level layers 206a-b that each include similar features and functionality as the convolutional layers 108, fully-functional layers 110, and one or more additional layers preceding the loss layer 112 described above in connection with FIG. 1. The image rating system can train the low level layers 206a-b to analyze low-level characteristics of the training images. Moreover, as shown in FIG. 2, the regression CNN 202 includes multiple branches for training pairs of training images 204a-b from the database of training images.

For example, the image rating system 100 selects pairs of training images 204a-b from the database of training images to train the regression CNN 202 to accurately predict an aesthetic quality score for a digital image. Additionally, as used herein, the "dataset of training data" refers to information associated with training images from a database of training images. For example, the dataset of training data includes user ratings associated with the respective training images. In one or more embodiments, the dataset of training data additionally includes attribute information associated with each of the respective images. For example, the dataset of training data includes an identifier of a respective attribute present in a training image. Additionally, the dataset of training data includes a user rating of aesthetic quality for one or more individual attributes present in a training image. Further, in one or more embodiments, the dataset of training data includes associated user data (e.g., an identity of a user associated with a user rating) or an identification of content (or content type) for a particular training image (e.g., landscape image, portrait image).

Various methods and criteria for selecting the image pairs 204a-b will be described in further detail below. Once selected, the image rating system 100 trains the regression CNN 202 by running each of the image pairs 204a-b through respective branches of the regression CNN 202. The image rating system 100 can run any number of iterations for individual image pairs 204a-b or any number of selected image pairs from the training database.

For example, as shown in FIG. 2, the image rating system 100 runs a first plurality of training images 204a through a first branch of the regression CNN 202 including a first plurality of low level layers 206a having one or more convolutional layers, fully-connected layers, and any additional layers of the regression CNN 202 preceding the loss layer along the first branch. The first branch further includes a first regression loss model 210a and a pairwise loss model 212. Similarly, as shown in FIG. 2, the image rating system 100 runs a second plurality of training images 204b (e.g., paired to the first plurality of training images 204a) through a second branch of the regression CNN 202 including a second plurality of low level layers 206b similar to the first plurality of low level layers 206a of the first branch. The second branch further includes a second regression loss model 210b and the pairwise loss model 212 shared with the first branch.

The image rating system 100 jointly trains the different branches of the regression CNN 202 including the low level layers 206a-b and the loss layer 208. For example, the image rating system 100 trains the low level layers 206a-b of the regression CNN 202 to jointly learn low level parameters of the training images. In particular, the low level layers 206a-b are trained to learn low level image characteristics of the training images. By jointly training the low level layers 206a-b of the regression CNN 202, the loss models 210a-b can share resources of the low level layers 206a-b while training the loss models 210a-b. As such, each branch of components within the loss model 210a-b need not utilize different paths of low level layers 210a-b. Thus, while FIG. 2 shows a low level layers 206a-b for each of the pairs of training images 204a-b, it is appreciated that each of the pairs of training images 204a-b can run through a single path of low level layers when training different loss models of the loss layer 208.

Additionally, the image rating system 100 trains each of the regression loss models 210a-b by fine-tuning respective regression loss functions based on training data from respective training images 204a-b. For example, the image rating system 100 fine-tunes a regression loss function of the first regression loss model 210a using training data associated with the first plurality of paired training image 204a. The image rating system 100 also fine-tunes a similar regression loss function of the second regression loss model 210b using training data from the second plurality of paired training images 204b. More specifically, the image rating system 100 runs multiple iterations of the paired images 204a-b for each of the regression loss functions 210a-b based on training data for respective image pairs 204a-b.

In one or more embodiments, the image rating system 100 trains the regression loss models 210a-b by fine-tuning a similar regression loss function as described above in connection with the loss layer 112 of FIG. 1. For example, each of the regression loss models 210a-b can include a Euclidean loss function as described above in connection with the loss layer 112 of FIG. 1. Similar to one or more embodiments described above, the image rating system 100 trains each of the regression loss models 210a-b by fine-tuning the Euclidean loss function based on training data from the database of training images. In one or more embodiments, the image rating system 100 trains each of the regression loss models 210a-b using the same set of training images. For example, each of the regression loss models 210a-b can be trained using a set of training images selected from the database of training images. Alternatively, in one or more embodiments, the image rating system 100 trains each of the regression loss models 210a-b using a different set of training images. For example, the image rating system 100 trains the first regression loss model 210a using training data from the first set of the paired training images 204a. Further, the image rating system 100 can train the second regression loss model 210b using training data from the second set of the paired training images 204b.

In one or more embodiments, the image rating system 100 trains the respective regression loss models 210a-b independent from one another. For example, the image rating system 100 trains the first regression loss model 210a using first training images from selected image pairs without considering the second training images from the same selected image pairs. Additionally, the image rating system 100 trains the second regression loss model 210b using second training images from selected image pairs without considering the first training images from the same selected image pairs. Alternatively, in one or more embodiments, the image rating system 100 trains each of the regression loss models 210a-b using a common dataset of training data. For example, the image rating system 100 can individually fine-tune each of the regression loss models 210a-b based on the same or overlapping collection of training images.

Additionally, as shown in FIG. 2, the regression CNN 202 further includes a pairwise loss model 212 that exploits relative rankings of the pair of training images 204a-b (and other selected pairs of training images). In particular, the image rating system 100 can train the regression CNN 202 to output aesthetic quality scores for identified pairs of training images 204a-b that maintain a relative difference between user provided ratings for the identified pairs of training images. As shown in FIG. 2, the image rating system 100 can train the pairwise loss model 212 to generate an output (e.g., an estimated score) based on a combination of training results from the regression loss models 210a-b and the pairwise loss model 212.

In one or more embodiments, the image rating system 100 trains the pairwise loss model 212 based on multiple inputs including outputs from each of the regression loss models 210a-b and corresponding user provided rankings from the dataset of training data. For example, the image rating system 100 trains the pairwise loss model 212 based on relative user rankings from the training data for respective image pairs 204a-b and corresponding estimated scores for the image pairs 204a-b as predicted by the regression loss models 210a-b. In one or more embodiments, the pairwise loss model 212 exploits relative rankings from both the dataset of training data as well as estimated rankings from the regression loss models 210a-b.

For example, in one or more embodiments, the image rating system 100 trains the pairwise loss model 212 by fine-tuning a pairwise loss function to maintain a relative difference between the user provided ratings of the identified image pairs. In particular, the image rating system 100 runs any number of iterations through the regression CNN 202 to train a pairwise loss function to output an estimated aesthetic quality score for a digital image. In one or more embodiments, the image rating system 100 utilizes the following pairwise loss function:

$$loss_{rank} = \frac{1}{2N} \sum_{i,j} \max(0, \alpha - \delta(y_i - y_j)(\bar{y}_i - \bar{y}_j))$$

$$\text{where } \delta(y_i - y_j) = \begin{cases} 1, & \text{if } y_i > y_j \\ -1, & \text{if } y_i < y_j \end{cases}$$

and where N represents the number of image pairs for the dataset, $\alpha$ is a predetermined margin between pairs of rankings, $y_i$ is a user-rated score for a first image pair and $y_j$ is a user-rated score for a second corresponding image pair to $y_i$. Additionally, each of $\bar{y}_i$ and $\bar{y}_j$ refer to outputs (e.g., estimated user-ratings) from corresponding regression models 210a-b for images from the selected image pairs corresponding to $y_i$ and $y_j$. In one or more embodiments, the regression loss models 210a-b each utilize a similar Euclidean loss function as described above.

Upon training the pairwise loss model 212, the image rating system 100 utilizes the outputs of the regression loss models 210a-b and the pairwise loss model 212 to generate a combined loss function that estimates an aesthetic quality score for a digital image. In particular, the image rating system 100 utilizes the results of training each of the regression loss models 210a-b and pairwise loss model 212 to fine-tune a combined loss function written as, $$loss_{reg+rank} = \omega_{reg} loss_{reg} + \omega_{rank} loss_{rank}$$

where $\omega_{reg}$ and $\omega_{rank}$ control the relative importance of each of the respective loss functions. In particular, $\omega_{reg}$ represents a relative weight of the regression loss function (e.g., Euclidean loss function) and $\omega_{rank}$ represents a relative weight of the pairwise loss function. In one or more embodiments, the image rating system 100 additionally fine-tunes each of the relative weights for each of the loss functions to more accurately estimate an aesthetic quality score for one or more digital images. For example, where the regression CNN is trained to output an aesthetic quality score ranking from 0 to 1, in one or more embodiments, the image rating system 100 sets an initial learning rate at a small number (e.g., 0.0001) for all layers of the regression CNN 202, and periodically annealed by 0.1. The image rating system 100 can further use a weight decay of 1e-5 and having a momentum of 0.9.

Thus, the image rating system 100 can train the regression CNN 202 to generate an aesthetic quality score using one or more regression loss models 210a-b and a pairwise loss model 212 that generates a wide spectrum of scores. In particular, the combination of the pairwise loss model and the regression loss model compares relative rankings between pairs of training images as well as normalizes the difference between relative rankings to accurately estimate an aesthetic quality score that accurately reflects those user-ratings for the respective image pairs 204a-b.

As mentioned above, the image rating system 100 utilizes various methods and criteria for selecting image pairs 204a-b to train the regression loss models 210a-b and the pairwise loss model 212. In particular, the image rating system 100 can intelligently select image pairs 204a-b from the database of training images that fit certain criteria to improve the training process of the regression CNN 202. Alternatively, the image rating system 100 trains the regression CNN 202 to identify image pairs 204a-b that meet particular criteria to use in training specific branches of the regression CNN 202. As such, the image rating system 100 can train the regression CNN 202 to generate more accurate aesthetic quality scores and further train the regression CNN 202 using fewer training images.

For example, in one or more embodiments, the image rating system 100 or regression CNN 202 identifies pairs of images 204a-b from a group of similar image-types (e.g., having similar types of content). In particular, the regression CNN 202 can receive image pairs 204a-b from a group of images that have been classified or otherwise identified as similar types of images (e.g., portrait images, landscape images). In one or more embodiments, the image rating system 100 clusters the training images by image-type and selects the image pairs 204a-b from the clustered groups of training images 204a-b of similar types. As such, the image rating system 100 can more efficiently train the regression CNN 202 using image pairs 204a-b of similar content-types.

As another example, in one or more embodiments, the image rating system 100 identifies image pairs 204a-b that have been rated by the same user to use as pairs of training images 204a-b. For example, the image rating system 100 can generate or identify clusters of user ratings that correspond to individual users and train regression CNN 202 using pairs of training images 204a-b rated by the same user. As user ratings from common users tend to be more consistent, the image rating system 100 can more efficiently train the regression CNN 202 using image pairs 204a-b having associated user-ratings from similar users.

As mentioned above, the image rating system 100 can cluster the training images based on image type (e.g., content clusters), user identifiers, attributes, and other factors. In one or more embodiments, the training images are clustered into a defined number of clusters using a k-means clustering algorithm. For example, in one or more embodiments, the training images can be represented using a fully connected layer of the regression CNN 202 to normalize the feature vector to be unit Euclidean length, and use an unsupervised k-means for clustering. In one or more embodiments, the training images are clustered into k=10 content groups, and differences in user ratings between testing images and centroids into prediction weights using a soft-max are transformed.

In one or more embodiments, image pairs 204a-b are selected that have been rated based on a threshold number of common users that have provided user ratings for the image pairs 204a-b. For example, in one or more embodiments, the image rating system 100 identifies image pairs 204a-b upon determining that more than half of the associated user-ratings originate from a common set of users. Alternatively, in one or more embodiments, the image rating system 100 identifies image pairs 204a-b upon determining that any of the associated user ratings originate from a common user.

As another example, in one or more embodiments, the image rating system 100 identifies image pairs 204a-b for training the regression CNN 202 based on a number of common attributes between the training images. For example, as described in greater detail below, training images 204a-b may be identified based on a determination that the training images each have a threshold number of common attributes. For instance, in one or more embodiments, the image rating system 100 identifies image pairs 204a-b upon determining that the image pairs have at least three attributes in common.

Moreover, in one or more embodiments, the image rating system 100 selects image pairs 204a-b having a defined difference in user ratings to use in training the regression CNN 202. For example, the image rating system 100 identifies image pairs having an average user rating that differ by a specific score or rating (e.g., percentage). In particular, by biasing the sampling of training images towards pairs of images with relatively large differences, a difference in average rating is likely to be stable between the image pairs. As such, the image rating system 100 can more effectively train the loss layer 208 including the pairwise loss model 212 to distinguish and exploit relative rankings of image pairs 204*a-b*.

In one or more embodiments, the image rating system 100 selects image pairs 204*a-b* having a defined difference based on a predetermined characteristic relationship of the training images. In particular, the image rating system 100 can select image pairs 204*a-b* based on similar or different characteristics between the training images. For example, the image rating system 100 selects image pairs having a first defined difference for image pairs 204*a-b* that have been rated by one or more of the same user. Alternatively, the image rating system 100 selects image pairs 204*a-b* having a second defined difference for image pairs that have not been rated by one or more of the same user. Because user ratings from the same user tend to be more consistent with each other, in one or more embodiments, the image rating system 100 selects image pairs 204*a-b* having a smaller defined difference when identifying image pairs 204*a-b* from a group of training images that have been rated by one or more of the same user than when identifying image pairs 204*a-b* from a group of training images that have not been rated by one or more of the same user.

Moreover, similar to selecting images having a defined difference in user-rating based on whether one or more of the same user has rated the image pairs 204*a-b*, the image rating system 100 can similarly select image pairs 204*a-b* having defined differences in ratings based on a relationships of other features or characteristics of the training images. For example, the image rating system 100 identifies image pairs 204*a-b* having a defined difference in user-rating based on a number of attributes in common between the training images. Additionally, the image rating system 100 identifies image pairs 204*a-b* having a defined difference in user-rating based on whether the training images have similar content therein.

Thus, as described above, the image rating system 100 trains the regression CNN 202 through a pairwise model that takes a pair of images as input and trains the CNN 202 to predict relative rankings of image aesthetics in addition to an overall aesthetic quality score. Additionally, as described above, the image rating system utilizes different sampling strategies of image pairs to leverage additional side-information to regularize the training. For example, identifying graphical attributes, image content, and identities of users that have rated particular training images, the regression CNN 202 provides a more fine-grained regression framework, providing more comparable and consistent aesthetic scoring results. In particular, utilizing content-aware, user-aware, and other sampling techniques for selecting training images enables the image rating system 100 to train the CNN 202 to minimize inaccuracies in aesthetic scores caused as a result of inconsistent user ratings between different users as well as inconsistencies between training images as a result of content therein.

Figure 3:
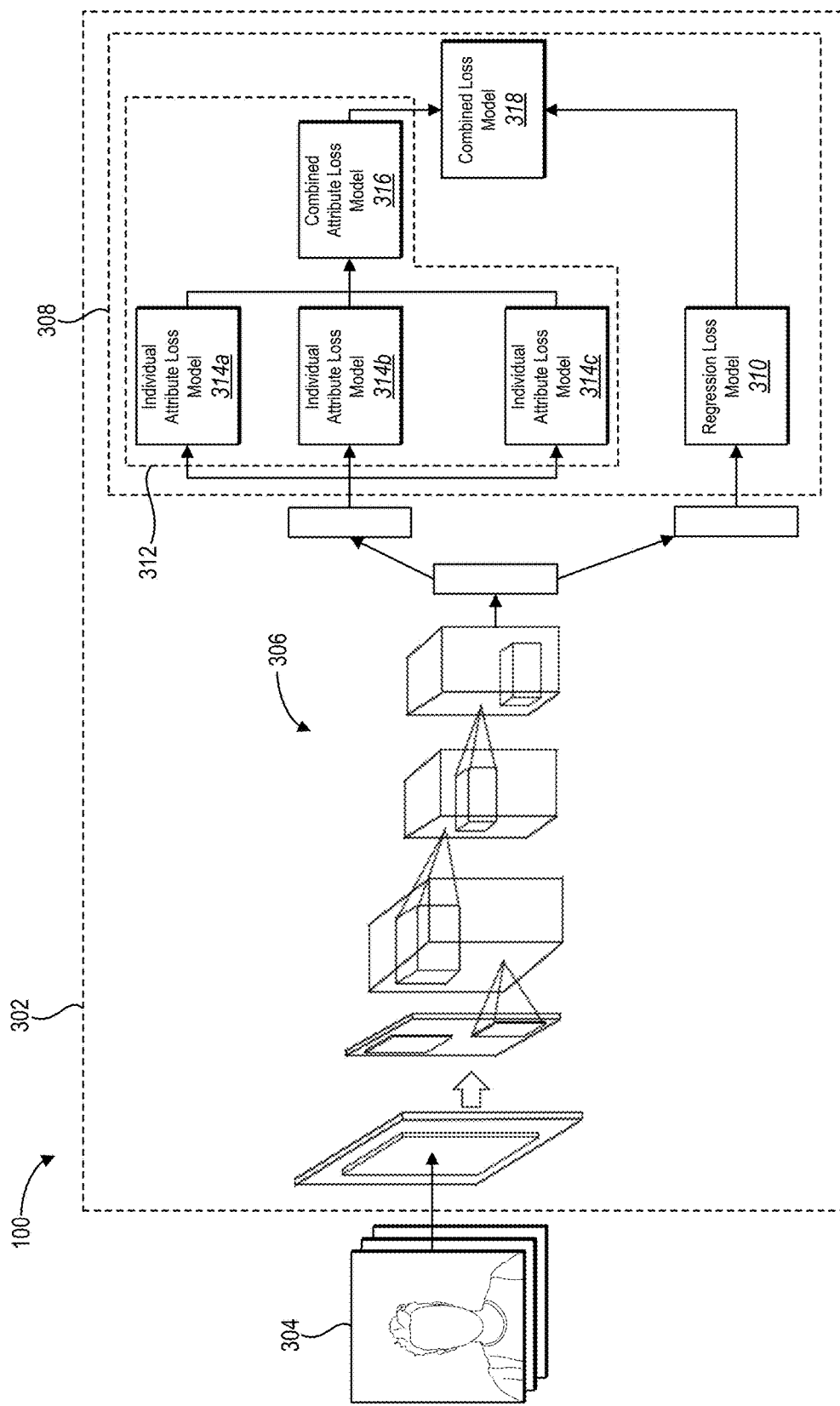
FIG. 3 illustrates a diagram of a process of training a regression CNN including a regression loss model and an attribute specific model in accordance with one or more embodiments.

Turning now to FIG. 3, the image rating system 100 can also train a regression CNN 302 to generate an aesthetic quality score using one or more of the same properties and functionality as described above in connection with the regression CNNs 102, 202 of FIGS. 1-2. Additionally, as shown in FIG. 3, the image rating system 100 can train a regression CNN 302 including low-level layers 306 and a loss layer 308. The low level layers 306 can include similar properties as the low level layers 206*a-b* described above in connection with FIG. 2 and may include any number of convolutional layers, full feature layers, and additional layers that precede the loss layer 308 within the regression CNN 302. As shown in FIG. 3, the attribute loss models 314*a-c* and regression loss model 310 share or otherwise utilize the jointly learned low level layers 306 of the regression CNN 302. Thus, the individual attribute models 314*a-c* utilize jointly learned low level parameters of the regression CNN 302.

As shown in FIG. 3, the loss layer 308 includes a regression loss model 310 and an attribute branch 312 including individual attribute loss models 314*a-c* and a combined attribute loss model 316. The loss layer 308 further includes a combined loss model 318 for combining outputs from the regression loss model 310 and attribute branch 312. As shown in FIG. 3, each of the individual attribute models 314*a-c* and the regression loss model 310 share resources of the low level layers 306 that precede the loss layer 308. For example, in training each of the individual loss models 314*a-c* and the regression loss model 310, the image rating system 100 can run training data associated with a plurality of training images 304 through the same low level layers 306 rather than running the training data through separate branches for each of the individual attribute loss models 312*a-c* and regression loss model 310 that include respective convolutional layers, fully-connected layers, and one or more additional layers of the regression CNN 302.

In one or more embodiments, the regression loss model 310 includes similar properties as the regression loss models 210*a-b* described above in connection with FIG. 3. In particular, the image rating system 100 trains the regression loss model 310 to generate an estimated aesthetic quality score for a digital image. More specifically, in one or more embodiments, the image rating system 100 trains the regression loss model 310 by fine-tuning a regression function (e.g., Euclidean loss function) to generate an overall aesthetic quality score for a digital image. For example, in one or more embodiments, an output of the regression loss model 310 includes an overall aesthetic quality score that reflects an overall predicted quality (e.g., overall quality score) for a digital image independent from one or more individual attribute quality scores.

As used herein an "image attribute" or "attribute" refers to an identifiable trait or aesthetic feature of a digital image. In particular, an image attribute can refer to a feature of the content of a digital image related to an aesthetic value of a digital image. For example, as used herein, an image attribute can refer to features of image content including, but not limited to, (1) interesting content, (2) object emphasis, (3) good lighting, (4) color harmony, (5) vivid color, (6) depth of an image field, (7) motion blur, (8) rule of thirds, (9) balancing element, (10) repetition, and (11) symmetry. In one or more embodiments, the regression CNN can be trained to identify one or more attributes and/or generate an attribute rating for one or a combination of image attributes.

As shown in FIG. 3, the attribute branch 312 of the loss model 308 includes individual attribute loss models 314*a-c* corresponding to identifiable attributes within digital images. In one or more embodiments, each of the individual attribute loss models 314*a-c* corresponds to a respective attribute. In one or more embodiments, the image rating system 100 trains the individual attribute loss models 314*a-c* to generate individual attribute quality scores for any number of attributes that are identified within a digital image. As an example, a first individual attribute loss model 314*a* is trained to identify or otherwise rate a first attribute (e.g., lighting). Additionally, the second and third individual attribute loss models 314b-c are trained to identify or otherwise rate a second attribute (e.g., motion blur) and a third attribute (e.g., rule of third), respectively. In one or more embodiments, the image rating system 100 trains one or more of the individual attribute loss models 314a-c to identify whether or not a particular attribute is present within a digital image. Alternatively, in one or more embodiments, the image rating system 100 trains one or more of the individual attribute loss models 314a-c to generate an individual attribute quality score falling within a range of values for each of the individual attributes.

While FIG. 3 illustrates an attribute branch 312 including three individual attribute loss models 314a-c, it is appreciated that the attribute branch 312 can include additional or fewer individual attribute loss models. For example, in one or more embodiments, the attribute branch 312 includes an attribute loss model for each individual attribute included within the training data. By way of example, one or more embodiments of the attribute branch 312 includes individual attribute loss models corresponding to the following attributes: (1) interesting content, (2) object emphasis, (3) good lighting, (4) color harmony, (5) vivid color, (6) depth of an image field, (7) motion blur, (8) rule of thirds, (9) balancing element, (10) repetition, and (11) symmetry.

Similar to other loss models described herein, the image rating system 100 can train each of the individual attribute loss models 314a-c based on a dataset of training data including attribute information obtained from various users with regard to training images. For example, in one or more embodiments, the dataset of training data includes instances of training data where users have identified one or more of the various attributes present within each of the training images. In one or more embodiments, the dataset of training images includes a simple identification indicating whether a specific attribute is present within a training image. Additionally or alternatively, in one or more embodiments, the dataset of training images includes more detailed information including user attribute ratings associated with each of the training images.

Using the training data, the image rating system 100 can train the individual attribute loss models 314a-c to predict whether a specific attribute is present within a digital image or otherwise score attributes of the digital image. In one or more embodiments, the image rating system 100 trains each of the individual attribute loss models 314a-c by fine-tuning an attribute loss function to estimate an attribute specific score or rating. For example, in one or more embodiments, the image rating system 100 trains a Euclidean loss function for each of the individual attributes. To illustrate, the image rating system 100 utilizes the following Euclidean loss function:

$$loss_{att_m} = \frac{1}{2N}\sum_{i=1}^{N}\|\bar{a}_i - a_i\|_2^2 = \frac{1}{2N}\sum_{i=1}^{N}\|CNN_{att_m}(X_i) - a_i\|_2^2$$

where N represents the number of training images for the dataset, $X_i$ is the i-th training image, $a_i$ is a user identification or rating score for an individual attribute, and $\bar{a}_i = CNN(X_i)$ is the estimated individual attribute rating or score by an individual attribute model 314 for the training image $X_i$. It is appreciated that $CNN(X_i) - a_i$ represents a difference between an estimated score of the individual attribute regression model for a training image and a user-rated identifier or score (e.g., average score of multiple user-ratings) from the dataset of training data corresponding to the training image.

In one or more embodiments, the image rating system 100 trains each of the individual attribute loss models 314a-c by fine-tuning a similar Euclidean loss function. In one or more embodiments, each of the Euclidean loss functions is trained individually for each attribute. Alternatively, in one or more embodiments, each of the Euclidean loss functions corresponding to individual attributes is trained jointly with other attribute-specific Euclidean loss functions.

As shown in FIG. 3, the attribute branch 312 further includes a combined attribute loss model 316. In one or more embodiments, the image rating system 100 trains the combined attribute loss model 316 to generate a combined score based on a determined identification or score associated with each of the individual attribute (e.g., outputs of the individual attribute loss models). For example, the image rating system 100 fine-tunes a combined loss function that sums one or more scores associated with each of multiple attributes. In one or more embodiments, the image rating system 100 trains the combined attribute loss model to weight certain attributes differently than other (e.g., based on relative importance to overall aesthetic quality) based on the dataset of user ratings for the different attributes. Additionally, in one or more embodiments, the regression CNN weights different attributes more heavily when generating an aesthetic quality score for a digital image that contains one or more corresponding attributes.

As shown in FIG. 3, the loss layer 308 further includes a combined loss model 318. In one or more embodiments, the image rating system 100 trains the combined loss model 318 to generate an aesthetic quality score based on estimated values from both the regression loss model 310 and the combined attribute loss model 316. For example, the image rating system 100 utilizes the outputs of the regression loss model 310 and the combined attribute loss model 316 to fine-tune a combined loss function written as, $$loss = \omega_{reg}loss_{reg} + \omega_{att}\sum_{m=1}^{M}loss_{att_m}$$

where $\omega_{reg}$ and $\omega_{att}$ control relative importance of each of the respective loss functions. In particular, $\omega_{reg}$ represents a relative weight of the regression loss function (e.g., Euclidean loss function) and $\omega_{att}$ represents a relative weight of the combined attribute loss function. In one or more embodiments, the image rating system 100 additional fine-tunes each of the relative weights to more accurately estimate an aesthetic quality score for one or more digital images.

Additionally, in one or more embodiments, features from the regression CNN 202 shown in FIG. 2 is combined with the regression CNN 302 shown in FIG. 3. For example, in one or more embodiments, the image rating system 100 trains two branches of a regression CNN similar to the regression CNN 302 of FIG. 3 using image pairs selected using one or more selection criteria described herein (e.g., content-aware, user-aware, attribute-aware). Further, similar to the regression CNN 202 of FIG. 2, the predicted outputs for the image pairs and user ratings from the training data can be provided to a pairwise loss function trained to generate an aesthetic quality score. In one or more embodiments, the image rating system 100 fine-tunes a combined loss function written as, $$\text{loss} = \omega_{reg} \text{loss}_{reg} + \omega_{rank} \text{loss}_{rank} + \omega_{att} \sum_{m=1}^{M} \text{loss}_{att_m}$$

where $\omega_{reg}$, $\omega_{rank}$, and $\omega_{att}$ control the relative importance of each of the respective loss functions. Additionally, the image rating system 100 can train the respective weights for each of the loss functions to fine-tune an aesthetic quality score for the combined loss function.

It is appreciated that the different loss models and associated loss functions can be combined to generate an aesthetic quality score for one or more digital images run through the regression CNNs 102, 202, 302. For example, depending on information available in the dataset and/or whether certain information can be detected or otherwise identified for a digital image, one or more embodiments of the image rating system 100 uses one or more combinations of the different trained regression CNNs 102, 202, 302. Alternatively, selection and use of a particular regression CNN 102, 202, 302 can depend on computing resources or other factors.

FIGS. 4A-4C illustrates example test results based on or more combinations of loss models utilized in connection with a trained regression CNN. In particular, FIGS. 4A-4C illustrates the results of a comparison between a dataset of testing images having known user ratings to aesthetic quality scores generated for the testing images by trained regression CNN using a combination of the above described loss models. For example, FIGS. 4A-4C show results of different testing models including a mean absolute error (MAE) comparison, means squared error (MSE) comparison, and Spearman's constant (ρ) rank correlation statistic comparison. It is appreciated that lower values for the MAE and MSE comparisons indicate higher similarity between the generated aesthetic quality scores and the user ratings of the testing images while a higher value for the Spearman's comparison indicates higher similarity between the generated aesthetic quality scores and the user ratings of the testing images.

FIG. 4A illustrates a table 402 of similarity results for a conventional binary prediction model and regression CNNs that utilize a Euclidean prediction model (e.g., regression prediction model), a pairwise prediction model, and a combination of a Euclidean and pairwise prediction model. FIG. 4B illustrates a table 404 of similarity results for the conventional binary prediction model, the Euclidean prediction model, and a combination of the Euclidean and attributes prediction model. As shown in FIGS. 4A-4B, each of the regression CNNs yield more accurate results than the binary prediction model.

FIG. 4C illustrates a table 406 of similarity results for a median guess model (e.g., estimating that a digital image will reflect the median user-ranking for a set of training images), a conventional AlexNet Convolution model, and different regression CNNs that utilize one or more models as described above. For example, the table 406 of FIG. 4C includes similarity results for regression CNNs including a Euclidean prediction model, a combination of a Euclidean and pairwise prediction model for training images rated by different users, a combination of a Euclidean and pairwise prediction model for training images rated by one or more common users, a combination of the Euclidean, pairwise, and attribute prediction model, a combination of the Euclidean and a content-aware pairwise prediction model, and a combination of the Euclidean, pairwise, attribute, and content-aware prediction model. As shown in FIG. 4C, each of the regression CNNs yield more accurate results than the median guess and AlexNet Convolution prediction model.

Figure 5:
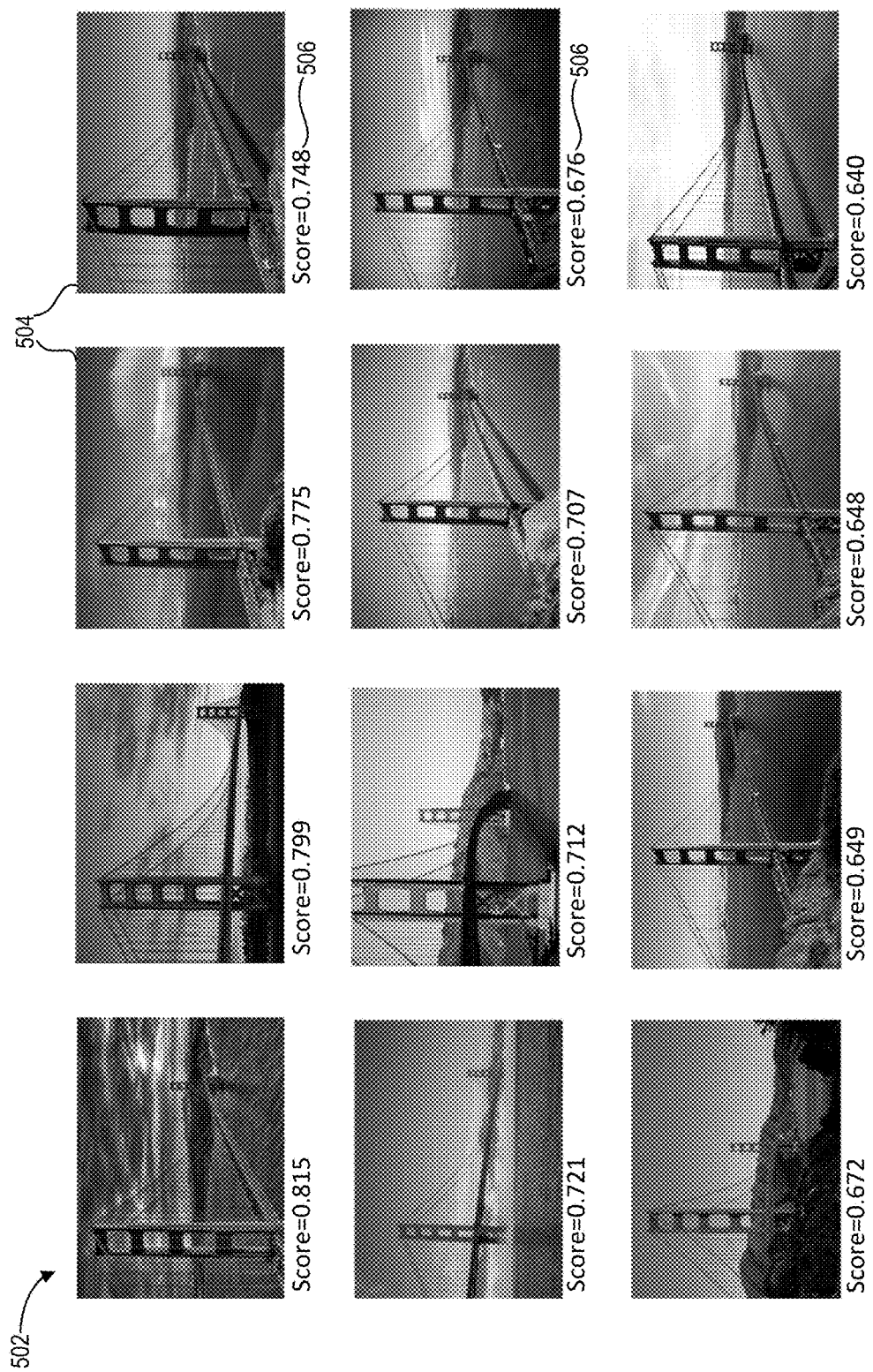
FIG. 5 illustrates an example collection of digital images and associated aesthetic quality scores in accordance with one or more embodiments.

As mentioned above, the generated aesthetic quality scores can be utilized in a variety of applications. For example, in one or more embodiments, a computing system (e.g., a server device, computing device) categorizes, sorts, labels, retrieves, or otherwise manages a collection of digital images based on generated aesthetic quality scores for the collection of digital images. Additionally, categorizing, sorting, or otherwise managing the collection of digital images based on the generated aesthetic quality score can be utilized to facilitate a better search experience (e.g., when searching a collection of digital images). To illustrate, FIG. 5 shows a collection 502 of digital images 504 and associated aesthetic quality scores. As shown in FIG. 5, the images 504 are sorted in accordance with generated aesthetic quality scores.

Figure 6:
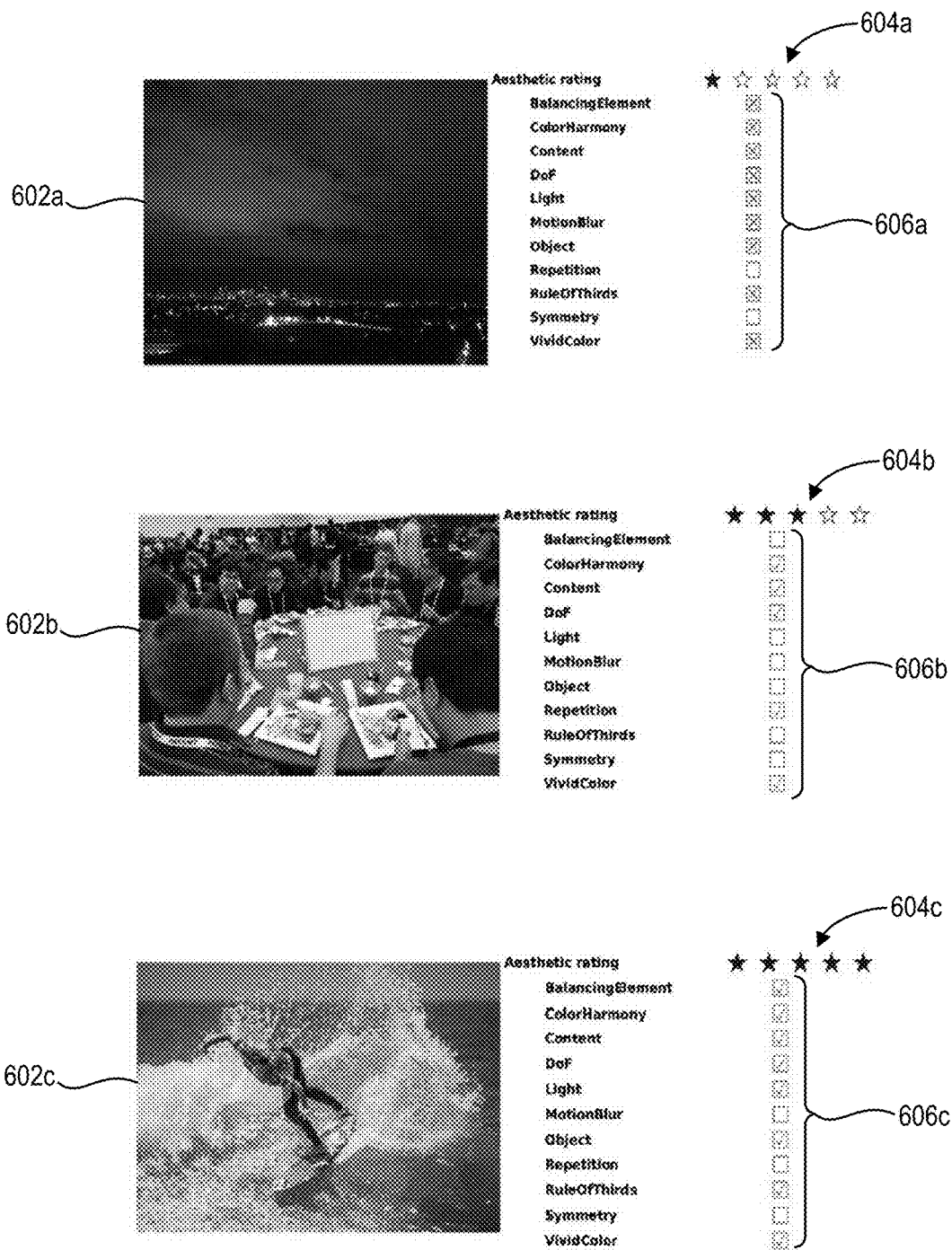
FIG. 6 illustrates an example collection of digital images and associated aesthetic quality scores for individual characteristics in accordance with one or more embodiments.

As mentioned above, an aesthetic quality score can include both an overall quality score in addition to one or more specific attribute quality scores. For example, as shown in FIG. 5, an overall quality score includes a numerical value assigned to one or more digital images. Additionally, as shown in FIG. 6, the overall quality score includes an overall rating for a digital image in addition to individual attribute ratings for the digital image. For example, FIG. 6 illustrates three sample images 602a-c that have been analyzed using a regression CNN in accordance with one or more embodiments described herein. As shown in FIG. 6, the regression CNN generates an overall quality score 604a-c on a scale of 1 to 5 stars in addition to generating specific attribute ratings 606a-c for each of the digital images.

Figure 7:
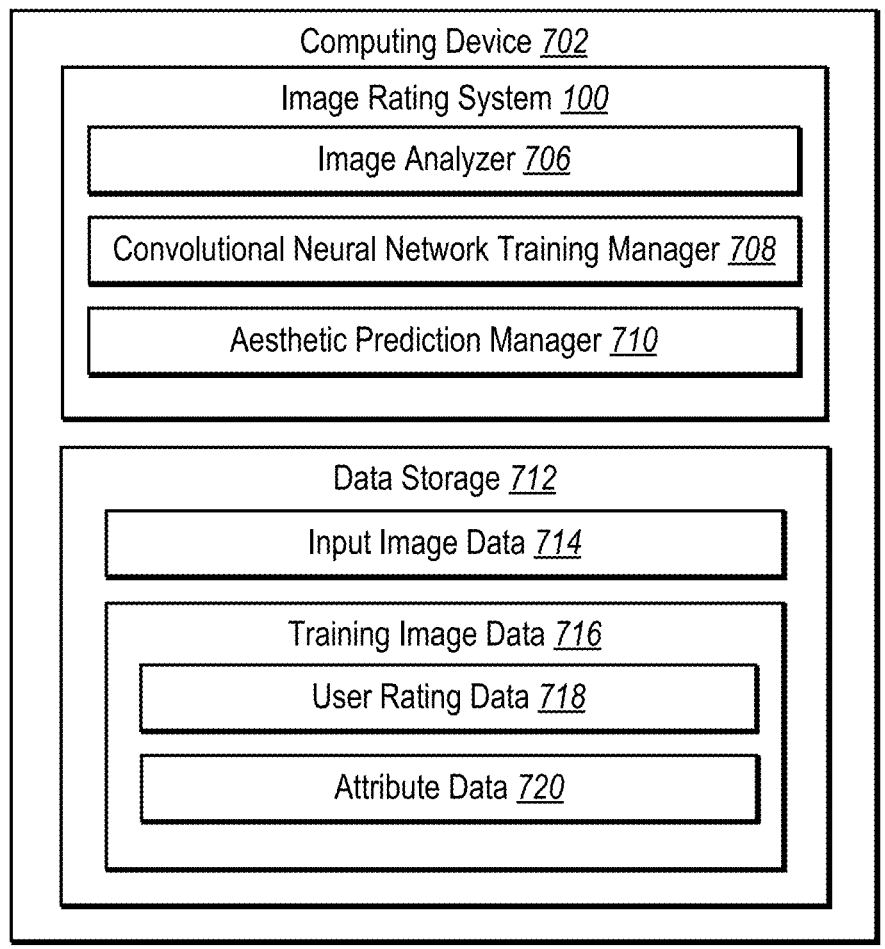
FIG. 7 illustrates a schematic diagram of an example image rating system in accordance with one or more embodiments.

Turning now to FIG. 7, additional detail will be provided regarding components and capabilities of an example architecture for an image rating system 100 that may be implemented on a computing device 702 in accordance with one or more embodiments. In particular, FIG. 7 illustrates an embodiment of an exemplary computing device 702 including an image rating system 100 that includes one or more features associated with one or more embodiments described above. For example, the image rating system 100 can train a regression CNN 102, 202, 302 to generate an aesthetic quality score for a digital image.

As shown in FIG. 7, the image rating system 100 includes an image analyzer 706, a convolutional neural network training manager 708 (or simply "CNN training manager 708") and an aesthetic prediction manager 710. Additionally, as shown in FIG. 7, the computing device 702 includes other has access to a data storage 712 including, for example, input image data 714 and training image data 716. As shown in FIG. 7, the training image data 716 includes user rating data 718 and attribute data 720.

As illustrated in FIG. 7, the image rating system 100 includes an image analyzer 706. In particular, the image analyzer 706 operates in connection with a regression CNN 102, 202, 302 to identify features and characteristics of a digital image. For example, the image analyzer 706 identifies that a digital image includes particular content and/or attributes. Additionally, as part of a training process, the image analyzer 706 can analyze training images to identify user information, attribute information, or other data associated with a training image. For example, in one or more embodiments, the image analyzer 706 extracts training data from a dataset of training data including information associated with a collection of training images.

As further illustrated in FIG. 7, the image rating system 100 includes a CNN training manager 708. In particular, the CNN training manager 708 can train a loss layer of a regression CNN 102, 202, 302 to predict an aesthetic quality score based on the dataset of training data. For example, in one or more embodiments, the CNN training manager 708 trains one or more loss models (e.g., regression loss models, pairwise loss models, attribute loss models) to predict overall aesthetic scores and attribute-specific scores for digital images. In one or more embodiments, the CNN training manager 708 trains one or more loss models by fine-tuning various loss functions (or combinations of loss functions) to output an accurate aesthetic quality score for a digital image.

Additionally, in one or more embodiments, the CNN training manager 708 efficiently trains the regression CNN 102, 202, 302 by intelligently selecting image pairs from a database of training images. For example, the CNN training manager 708 can select image pairs having predefined differences in user ratings and exploit the known relative differences of the image pairs when training one or more of the loss models. Additionally, the CNN training manager 708 can intelligently select image pairs based on content therein, detected attributes, and/or an identity of users that have rated the training images.

As further illustrated in FIG. 7, the image rating system 100 includes an aesthetic prediction manager 710. In particular, the aesthetic prediction manager 710 generates an aesthetic quality score using the trained regression CNN including one or more loss models described herein. In one or more embodiments, the aesthetic prediction manager 710 generates an aesthetic quality score that includes an overall quality score for a digital image. Additionally, in one or more embodiments, the aesthetic prediction manager 710 generates individual attribute quality scores for each of multiple identifiable attributes within a digital image.

As further illustrated in FIG. 7, the computing device 702 includes or has access to a data storage 712 including input image data 714. The input image data 714 can include any information associated with a digital image to be rated using a trained regression CNN 102, 202, 302. For example, in one or more embodiments, the input image data 714 includes attribute information, a content type for the digital image, or information obtained by the image analyzer 706. Additionally, the input image data 714 can include detected features or characteristics of a digital image detected or otherwise identified by the computing device 702.

As shown in FIG. 7, the data storage 712 further includes training image data 716 including any information associated with training images used to train a regression CNN 102, 202, 302. For example, in one or more embodiments, the training image data 716 includes user rating data 718 including user-assigned ratings for any number of training images. Additionally, the training image data 716 can include attribute data 720 including information associated with one or more attributes of the training images.

Each of the components 706-710 of the image rating system 100 and corresponding elements may be in communication with one another using any suitable communication technologies. It will be recognized that although components 706-710 and their corresponding elements are shown to be separate in FIG. 7, any of components 706-710 and their corresponding elements may be combined into fewer components, such as into a single facility or module, divided into more components, or configured into different components as may serve a particular embodiment.

The components 706-710 and their corresponding elements can comprise software, hardware, or both. For example, the components 706-710 and their corresponding elements can comprise one or more instructions stored on a computer-readable storage medium and executable by processors of one or more computing devices. When executed by the one or more processors, the computer-executable instructions of the image rating system 100 can cause a client device and/or a server device to perform the methods described herein. Alternatively, the components-716 and their corresponding elements can comprise hardware, such as a special purpose processing device to perform a certain function or group of functions. Additionally, the components-716 and their corresponding elements can comprise a combination of computer-executable instructions and hardware.

Furthermore, one or more of the components 706-710 of the image rating system 100 may, for example, be implemented as one or more stand-alone applications, as one or more modules of an application, as one or more plug-ins, as one or more library functions or functions that may be called by other applications, and/or as a cloud-computing model. Thus, one or more of the components 706-710 of the image rating system 100 may be implemented as a stand-alone application, such as a desktop or mobile application. Furthermore, one or more of the components 706-710 of the image rating system 100 may be implemented as one or more web-based applications hosted on a remote server. Alternatively or additionally, one or more components 706-710 of the image rating system 100 may be implemented in a suit of mobile device applications or "apps." To illustrate, one or more of the components of the image rating system 100 may be implemented in a digital image editing application, including but not limited to ADOBE® PHOTOSHOP® or ADOBE® REVEL®. "ADOBE®," "ADOBE® PHOTOSHOP®," and "ADOBE® REVEL®" are either registered trademarks or trademarks of Adobe Systems Incorporated in the United States and/or other countries.

FIGS. 1-7, the corresponding text, and the examples, provide a number of different systems and devices that allows an image rating system 100 to train and implement a regression CNN 102, 202, 302 to generate an aesthetic quality score for digital media. In addition to the foregoing, embodiments can also be described in terms of flowcharts comprising acts and steps in a method for accomplishing a particular result. For example, FIGS. 8-9 illustrates flowcharts of exemplary methods in accordance with one or more embodiments.

Figure 8:
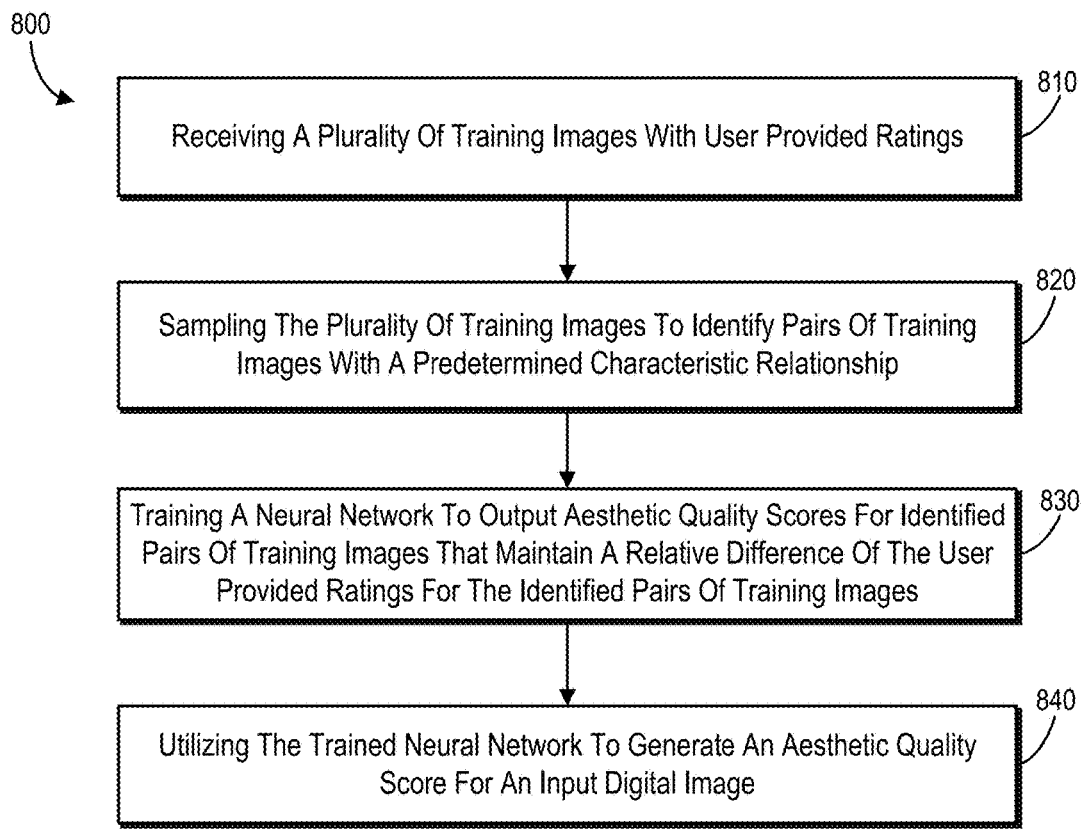
FIG. 8 illustrates a flowchart of a series of acts in a method for generating an aesthetic quality score for a digital image in accordance with one or more embodiments.
Figure 9:
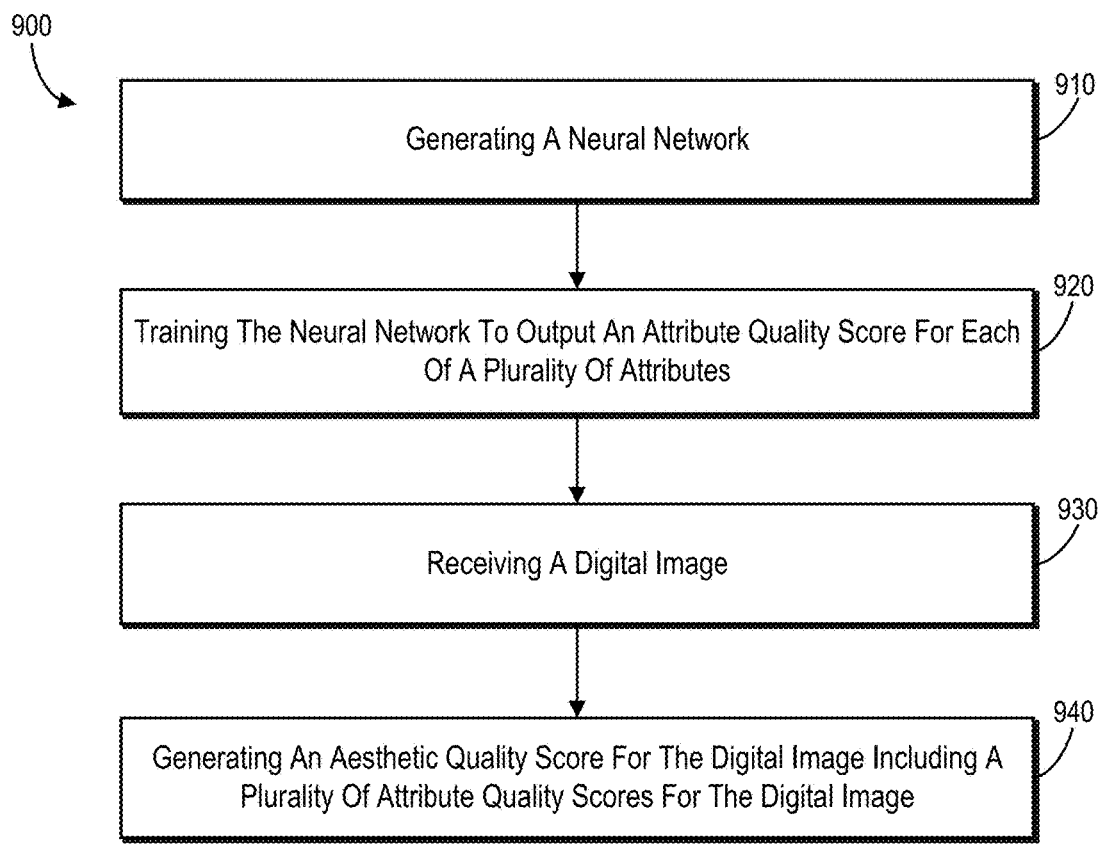
FIG. 9 illustrates a flowchart of a series of acts in another method for generating an aesthetic quality scores for individual characteristics of a digital image in accordance with one or more embodiments.

FIG. 8 illustrates a flowchart of a series of acts in a method 800 of using deep learning to analyze and estimate an aesthetic quality of digital images. In one or more embodiments, the method 800 is performed in a digital medium environment that includes an image rating system 100 (e.g., image rating system 100). The method 800 is intended to be illustrative of one or more methods in accordance with the present disclosure, and is not intended to limit potential embodiments. Alternative embodiments can include additional, fewer, or different steps than those articulated in FIG. 8.

As illustrated in FIG. 8, the method 800 includes an act 810 of receiving a plurality of training images with user provided ratings. In one or more embodiments, receiving the plurality of training images involves accessing a database of training images that have been rated by various users. For example, in one or more embodiments, receiving the plurality of training involves receiving a dataset of training data including user provided ratings for a database of training images. In one or more embodiments, the training data includes a predefined number of user ratings for each of the training images. As an example, the training data can include at least five user ratings for each of the plurality of training images. Additionally, in one or more embodiments, the training data includes an identification or rating of any identified attributes or content type of the plurality of training images. Further, in one or more embodiments, the training data includes an identification of one or more users that provided the user ratings.

As further illustrated in FIG. 8, the method 800 includes an act 820 of sampling the plurality of training images to identify pairs of training images with a predetermined characteristic relationship. In particular, the act 820 can include sampling, using at least one processor, the plurality of training images to identify pairs of training images with a predetermined characteristic relationship between selected image pairs. In one or more embodiments, sampling the plurality of training images to identify pairs of training images includes selecting an image pair for each of the training images that make up a database of training images.

Sampling the plurality of training images can involve considering one or a combination of predetermined characteristic relationships between training images. For example, in one or more embodiments, sampling the plurality of training images involves identifying image pairs associated with user rating from a common user. As another example, in one or more embodiments, sampling the plurality of training images involves identifying image pairs having a predetermined difference in user provided ratings. In one or more embodiments, the predetermined difference in user ratings for each of the identified image pairs differs based on whether an image pair is associated with user ratings form a common user or different users. As another example, in one or more embodiments, identifying image pairs from the plurality of training images includes identifying image pairs having common types of content between the image pairs. As another example, in one or more embodiments, identifying image pairs from the plurality of training images includes identifying image pairs having images that each comprise a threshold number of common attributes. In one or more embodiments, sampling the plurality of training images involves identifying image pairs based on a combination of characteristics. As an example, sampling the plurality of training images can involve identifying pairs of training images having a common type of content and that have been rated by one or more common users.

As further illustrated in FIG. 8, the method 800 includes an act 830 of training a neural network to output aesthetic quality scores for identified pairs of training images that maintain a relative difference of the user provided ratings for the identified pairs of training images. In particular, the act 830 can include training, by at least one processor, a regression CNN 102, 202, 302 to output aesthetic quality scores for identified pairs of training images that maintain a relative difference of the user provided ratings for the identified pairs of training images. For example, in one or more embodiments, training the neural network involves constructing a training structure that compares the relative difference in user provided ratings for the selected pairs of training images from the plurality of training images.

For instance, in one or more embodiments, training the neural network involves constructing a training structure including a pairwise loss model and a regression loss model. The pairwise loss model compares the relative difference in user provided ratings for the selected pairs of training images from the plurality of training images. Additionally, the regression loss model minimizes the difference between predicted user ratings and the user provided ratings for the plurality of training images. For example, in one or more embodiments, the regression model model minimizes the difference between predicted user ratings the user provided ratings by minimizing a Euclidean loss between an average user rating of the user provided user ratings for the plurality of training images and predicted user ratings for the plurality of training images.

As further illustrated in FIG. 8, the method 800 includes an act 840 of utilizing the trained neural network to generate an aesthetic quality score for one or more input digital images. In particular, in one or more embodiments, the act 840 involves utilizing, by the at least one processor, the trained neural network to generate an aesthetic quality score for one or more input digital images. As described above, the aesthetic quality score can include a score ranging from high to low representative of the wide spectrum of the user provided ratings of the training images. In one or more embodiments, generating the aesthetic quality score involves summing outputs of the regression loss model and the pairwise loss model to predict an overall quality score on a scale between high quality and low quality for the digital image.

Moreover, in one or more embodiments, the method 800 includes managing one or more digital images based on associated aesthetic quality scores for the digital images. For example, in one or more embodiments, upon generating the aesthetic quality score for the digital image, the method 800 further categorizes, sorts, stores, organizes, retrieves, or otherwise manages the digital image in accordance with the generated aesthetic quality score.

As mentioned above, FIG. 9 also illustrates a flowchart of a series of acts in a method 900 of using deep learning to analyze and estimate an aesthetic quality of digital images. Similar to the method 800 of FIG. 8, one or more embodiments of the method 900 is performed in a digital medium environment that includes an image rating system 100 (e.g., image rating system 100). The method 900 is intended to be illustrative of one or more methods in accordance with the present disclosure, and is not intended to limit potential embodiments. Alternative embodiments can include additional, fewer, or different steps than those articulated in FIG. 9.

As shown in FIG. 9, the method 900 includes an act 910 of generating a neural network. In particular, in one or more embodiments, the act 910 involves generating a regression CNN 102, 202, 302. For example, generating a regression CNN 102, 202, 302 can involve generating a neural network including one or more convolutional layers 108, one or more fully-connected layers 110, a loss layer 112, 208, 308, and any number of additional layers and models therein that may be trained to rate image aesthetics. Thus, in one or more embodiments, generating the neural network involves generating a neural network having a training structure that includes multiple layers and models that facilitate generating an aesthetic quality score for a digital image As further illustrated in FIG. 9, the method 900 includes an act 920 of training the neural network to output an attribute quality score for each of the plurality of attributes. In particular, in one or more embodiments, training the neural network involves training the neural network to minimize a difference between a predicted rating for a given attribute and user provided ratings for the given attribute. For instance, in one or more embodiments, training the neural network involves training the neural network to output an attribute quality score for attributes including two or more of interesting content, object emphasis, lighting, color harmony, vivid color, depth of an image field, motion blur, rule of thirds, balancing element, repetition, or symmetry.

Additionally, in one or more embodiments, training the neural network involves training the neural network to minimize a difference between predicted user ratings and user provided ratings for the plurality of training images. For example, in one or more embodiments, minimizing the difference between predicted user ratings and user provided ratings for the plurality of training images involves minimizing a Euclidean loss between a predicted overall quality rating and an average rating of the user provided ratings for each of the plurality of training images. Moreover, in one or more embodiments, training the neural network involves training the neural network to select pairs of the plurality of training images and comparing a relative difference in user provided ratings for the selected pairs of training images from the plurality of training images.

Moreover, in one or more embodiments, training the neural network involves jointly training low level parameters of the neural network. For example, with regard to a regression CNN 102, 202, 302, training the neural network involves jointly training any number of convolutional layers 108, full feature layers 110, and one or more additional layers of the regression CNN 102, 202, 302 and utilizing common resources of the jointly trained layers of the regression CNN 102, 202, 302 to train individual attribute models 314a-c within the training structure of the regression CNN 102, 202, 302. Thus, in one or more embodiments, training the neural network involves jointly training low level parameters of the neural network to analyze low level characteristics of the training images and individually training each of multiple attribute models 314a-c.

As mentioned above, in one or more embodiments, the structure of the neural network includes various layers and models therein. For example, in one or more embodiments, the training structure of the neural network includes a regression loss model trained to minimize a difference (e.g., Euclidean loss) between predicted user ratings and user provided ratings for the plurality of training images. Additionally, in one or more embodiments, the structure of the neural network includes an attribute model that minimizes a difference between a predicted rating for a given attribute and user provided ratings for the given attribute. Further, in one or more embodiments, the structure of the neural network includes a pairwise loss model that compares a relative difference in user provided ratings for selected pairs of training images from the plurality of training images.

As further illustrated in FIG. 9, the method 900 includes an act 930 of receiving a digital image. For example, in one or more embodiments, the act 930 involves receiving a digital image from a client device or server device. In one or more embodiments, the act 930 involves accessing a digital image from a collection of digital images. As further illustrated in FIG. 9, the method 900 includes an act 940 of generating an aesthetic quality score for the digital image including a plurality of attribute quality scores for the digital image. For example, in one or more embodiments, the aesthetic quality score can include an overall quality score in addition to scores for individual attributes of the digital image. In one or more embodiments, generating the aesthetic quality score involves generating, by at least one processor, an aesthetic quality score for the digital image and an attribute quality score for each of a plurality of attributes of the digital image using a neural network having a training structure that jointly learns low level parameters of a plurality of training images and includes an attribute model for each of the plurality of attributes that utilizes the jointly learned low level parameters and outputs an attribute quality score for a given attribute.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
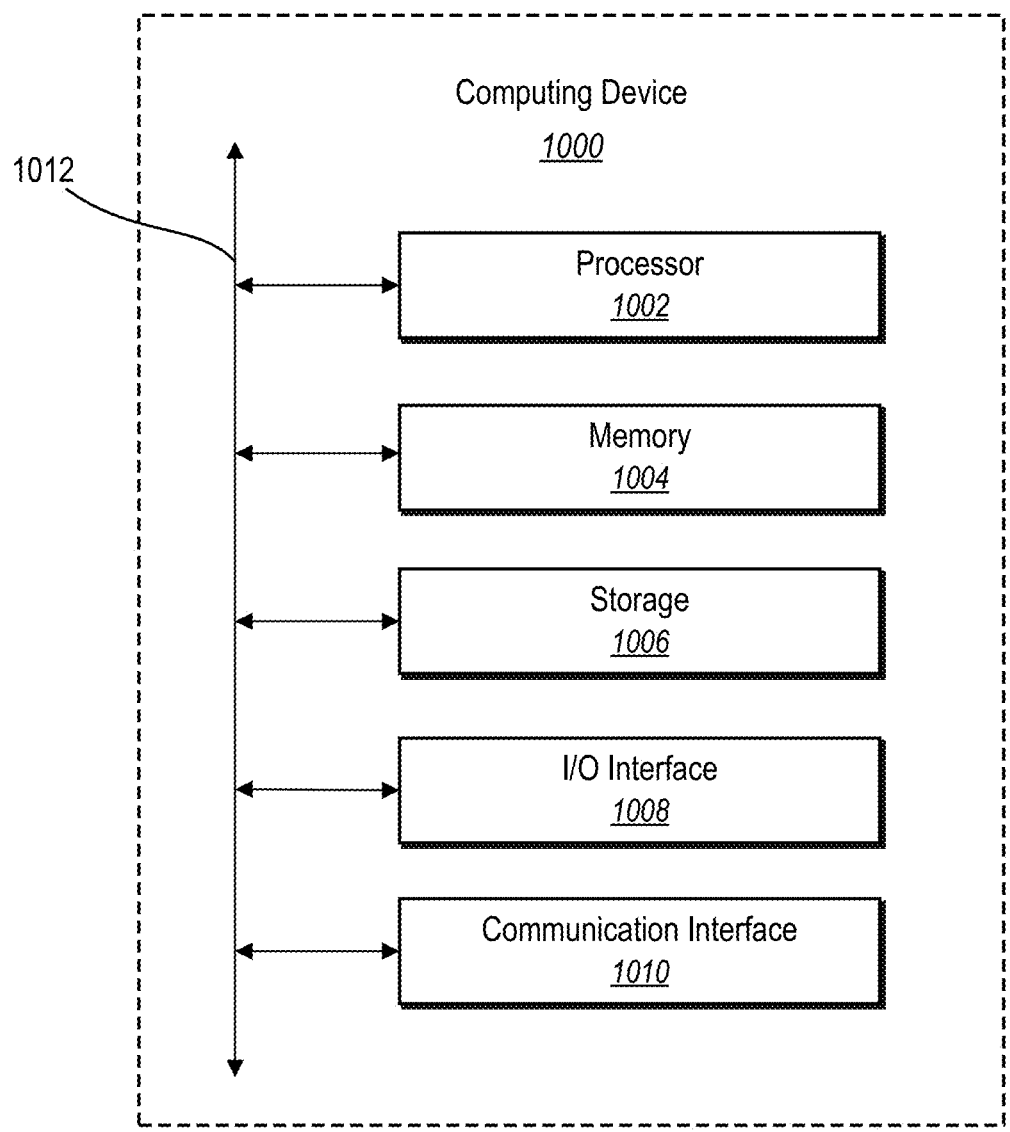
FIG. 10 illustrates a block diagram of a computing device in accordance with one or more embodiments.

FIG. 10 illustrates, in block diagram form, an exemplary computing device 1000 that may be configured to perform one or more of the processes described above. One will appreciate that one or more computing devices such as the computing device 1000 may implement the image rating system 100. As shown by FIG. 10, the computing device 1000 can comprise a processor 1002, memory 1004, a storage device 1006, an I/O interface 1008, and a communication interface 1010. In certain embodiments, the computing device 1000 can include fewer or more components than those shown in FIG. 10. Components of computing device 1000 shown in FIG. 10 will now be described in additional detail.

In particular embodiments, processor(s) 1002 includes hardware for executing instructions, such as those making up a computer program. As an example and not by way of limitation, to execute instructions, processor(s) 1002 may retrieve (or fetch) the instructions from an internal register, an internal cache, memory 1004, or a storage device 1006 and decode and execute them.

The computing device 1000 includes memory 1004, which is coupled to the processor(s) 1102. The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The computing device 1000 includes a storage device 1006 includes storage for storing data or instructions. As an example and not by way of limitation, storage device 1006 can comprise a non-transitory storage medium described above. The storage device 1006 may include a hard disk drive (HDD), flash memory, a Universal Serial Bus (USB) drive or a combination these or other storage devices.

The computing device 1000 also includes one or more input or output ("I/O") devices/interfaces 1008, which are provided to allow a user to provide input to (such as user strokes), receive output from, and otherwise transfer data to and from the computing device 1000. These I/O devices/interfaces 1008 may include a mouse, keypad or a keyboard, a touch screen, camera, optical scanner, network interface, modem, other known I/O devices or a combination of such I/O devices/interfaces 1008. The touch screen may be activated with a stylus or a finger.

The I/O devices/interfaces 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1008 is configured to provide graphical data to a display for presentation to a user. The graphical data may be representative of one or more graphical user interfaces and/or any other graphical content as may serve a particular implementation.

The computing device 1000 can further include a communication interface 1010. The communication interface 1010 can include hardware, software, or both. The communication interface 1010 can provide one or more interfaces for communication (such as, for example, packet-based communication) between the computing device and one or more other computing devices 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI. The computing device 1000 can further include a bus 1012. The bus 1012 can comprise hardware, software, or both that couples components of computing device 1000 to each other.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A computer-implemented method of estimating aesthetic quality of digital images using deep learning, the method comprising:
   receiving a digital image;
   generating a set of features for the digital image using a set of convolutional layers of a neural network;
   generating an attribute quality score for each of a plurality of attributes by processing the set of features generated using the set of convolutional layers of the neural network using a plurality of individual attribute models, the individual attribute models comprising individual sets of fully-connected layers in the neural network; and
   generating an aesthetic quality score for the digital image by processing the set of features generated using the set of convolutional layers of the neural network using an aesthetic quality model, the aesthetic quality model comprising a set of fully-connected layers in the neural network trained using a regression loss model.

2. The method as recited in claim 1, wherein the plurality of attributes comprise two or more of: interesting content, object emphasis, lighting, color harmony, vivid color, depth of an image field, motion blur, rule of thirds, balancing element, repetition, or symmetry.

3. The method as recited in claim 1, wherein generating the attribute quality score for each of the plurality of attributes comprising determining whether a given attribute is present in the digital image.

4. The method as recited in claim 1, wherein generating the set of features for the digital image using the set of convolutional layers of the neural network comprises extracting low level characteristics from the digital image.

5. The method as recited in claim 1, wherein generating the aesthetic quality score for the digital image comprises generating an overall quality score on a predetermined scale.

6. The method as recited in claim 1, further comprising:
   utilizing the neural network to generate aesthetic quality scores for a collection of input digital images; and
   categorizing the collection of input digital images based on the generated aesthetic quality scores.

7. A non-transitory computer readable storage medium storing instructions thereon that, when executed by at least one processor, cause a computer device to:
   receive a digital image;
   generate a set of features for the digital image using a set of convolutional layers of a neural network;
   generate an attribute quality score for each of a plurality of attributes by processing the set of features generated using the set of convolutional layers of the neural network using a plurality of individual attribute models, the individual attribute models comprising individual sets of fully-connected layers in the neural network; and
   generate an aesthetic quality score for the digital image by processing the set of features generated using the set of convolutional layers of the neural network using an aesthetic quality model, the aesthetic quality model comprising a set of fully-connected layers in the neural network.

8. The non-transitory computer readable storage medium as recited in claim 7, further comprising instructions that when executed by the at least one processor, cause the computing device to generate a graphical user interface comprising the aesthetic quality score and a plurality of attribute quality scores.

9. The non-transitory computer readable storage medium as recited in claim 7, wherein the plurality of attributes comprise two or more of: interesting content, object emphasis, lighting, color harmony, vivid color, depth of an image field, motion blur, rule of thirds, balancing element, repetition, or symmetry.

10. The non-transitory computer readable storage medium as recited in claim 7, wherein the plurality of attributes comprise interesting content, object emphasis, lighting, color harmony, vivid color, depth of an image field, motion blur, rule of thirds, balancing element, repetition, and symmetry.

11. The non-transitory computer readable storage medium as recited in claim 7, wherein the instructions, when executed by the at least one processor, cause the computing device to generate an attribute quality score for each of the plurality of attributes by determining whether a given attribute is present in the digital image.

12. The non-transitory computer readable storage medium as recited in claim 7, wherein the instructions, when executed by the at least one processor, cause the computing device to generate the set of features for the digital image using the set of convolutional neural network layers by extracting low level characteristics from the digital image.

13. The non-transitory computer readable storage medium as recited in claim 7, wherein the instructions, when executed by the at least one processor, cause the computing device to generate the aesthetic quality score for the digital image by generating an overall quality score on a predetermined scale.

14. A system for analyzing digital images to estimate aesthetic quality of the digital images using deep learning, the system comprising:
   a neural network comprising:
      a set of convolutional layers,
      an aesthetic quality model comprising a set of fully-connected layers, and
      a plurality of individual attribute models, the individual attribute models comprising individual sets of fully-connected layers;
   a plurality of training images with user provided ratings, the user provided ratings comprising an overall rating and individual attribute ratings;
   at least one processor;
   a non-transitory storage medium comprising instructions that, when executed by the at least one processor, cause the system to:

jointly train the set of convolutional layers and the fully-connected layers of the aesthetic quality model using a first regression loss model; and individually train each attribute model of the plurality of individual attribute models using a second regression loss model.

15. The system as recited in claim 14, wherein the instructions, when executed by the at least one processor, cause the system to jointly train the set of convolutional layers and the fully-connected layers of the aesthetic quality model by minimizing a difference between predicted user ratings and the user provided overall ratings for the plurality of training images.

16. The system as recited in claim 15, wherein minimizing the difference between the predicted user ratings and the user provided overall ratings for the plurality of training images comprises minimizing a Euclidean loss between a predicted overall quality rating and an average rating of the user provided ratings for each of the plurality of training images.

17. The system as recited in claim 14, wherein the instructions, when executed by the at least one processor, cause the system to jointly train the set of convolutional layers and the fully-connected layers of the aesthetic quality model by learning low-level parameters of the set of convolutional layers.

18. The system as recited in claim 17, wherein the instructions, when executed by the at least one processor, cause the system to individually train each attribute model of the plurality of individual attribute models using the second regression loss model by:

using the learned low-level parameters of the set of convolutional layers to generate a set of features for a training digital image;

using an attribute model to generate a predicted attribute score for the training digital image; and using the second regression loss model to minimize a difference between the predicted attribute score and a user provided attribute score for the training digital image.

19. The system as recited in claim 14, further comprising instructions that, when executed by the at least one processor, cause the system to employ a combined loss function that combines the first regression loss model and each of the second regression loss models.

20. The system as recited in claim 14, wherein the plurality of attributes comprise two or more of: interesting content, object emphasis, lighting, color harmony, vivid color, depth of an image field, motion blur, rule of thirds, balancing element, repetition, or symmetry.

* * * * *